(12) United States Patent
Monaghan

(10) Patent No.: US 10,867,260 B2
(45) Date of Patent: *Dec. 15, 2020

(54) METHODS AND SYSTEMS FOR FACILITATING DEVELOPMENT OF WEBSITE PROJECTS

(71) Applicant: 1175856 ONTARIO LTD., Cambridge, Ontario (CA)

(72) Inventor: Daniel J. Monaghan, Cambridge (CA)

(73) Assignee: 1175856 ONTARIO LTD., Cambridge (CA)

( * ) Notice: Subject to any disclaimer, the term of this patent is extended or adjusted under 35 U.S.C. 154(b) by 0 days.

This patent is subject to a terminal disclaimer.

(21) Appl. No.: 16/132,274

(22) Filed: Sep. 14, 2018

(65) Prior Publication Data
US 2019/0034840 A1 Jan. 31, 2019

Related U.S. Application Data

(63) Continuation of application No. 10/194,282, filed on Jul. 15, 2002, now Pat. No. 10,115,062.

(60) Provisional application No. 60/304,750, filed on Jul. 13, 2001.

(51) Int. Cl.
*G06Q 10/06* (2012.01)
*G06Q 10/10* (2012.01)
*G06Q 30/02* (2012.01)

(52) U.S. Cl.
CPC ......... *G06Q 10/06* (2013.01); *G06Q 10/0631* (2013.01); *G06Q 10/0637* (2013.01); *G06Q 10/10* (2013.01); *G06Q 30/0201* (2013.01)

(58) Field of Classification Search
CPC .............. G06Q 10/06; G06Q 10/0631; G06Q 10/0637; G06Q 10/10; G06Q 30/0201
See application file for complete search history.

(56) References Cited

U.S. PATENT DOCUMENTS

| | | | |
|---|---|---|---|
| 6,078,924 | A | 6/2000 | Ainsbury |
| 6,185,587 | B1 | 2/2001 | Bernado et al. |
| 6,253,198 | B1 | 6/2001 | Perkins |
| 6,546,397 | B1 | 4/2003 | Rempell |
| 6,629,135 | B1 | 9/2003 | Ross, Jr. et al. |
| 6,745,238 | B1 | 6/2004 | Giljum et al. |
| 6,792,475 | B1 | 9/2004 | Arcuri et al. |
| 7,152,207 | B1 | 12/2006 | Underwood et al. |
| 7,404,141 | B1 | 7/2008 | Giljum et al. |
| 7,668,913 | B1 | 2/2010 | Underwood et al. |
| 2001/0011265 | A1 | 8/2001 | Cuan et al. |
| 2002/0049697 | A1 | 4/2002 | Nakano et al. |

(Continued)

OTHER PUBLICATIONS

A user-based design process for Web sites EG Abelse, M Domas White, K Hahn—Internet research, 1998—emeraldinsight.com (Year: 1998).*

(Continued)

*Primary Examiner* — Jonathan G Sterrett
(74) *Attorney, Agent, or Firm* — DLA Piper LLP (US)

(57) ABSTRACT

Methods and systems for facilitating development of website projects. Electronic data can be received in functional design modules which can be utilized by a website developer to create the customized website. Access to the electronic data in the functional design modules can be automated. A website project can be obtained from the website developer. The customized website can be launched.

26 Claims, 43 Drawing Sheets

(56) References Cited

U.S. PATENT DOCUMENTS

2002/0078045 A1    6/2002  Dutta
2002/0158902 A1   10/2002  Hooker et al.
2003/0014442 A1    1/2003  Shiigi et al.

OTHER PUBLICATIONS

A top-down methodology for building corporate Web applications JM Artz—Internet Research, 1996—emeraldinsight.com (Year: 1996).*

Evaluating domestic and international web-site strategies R Simeon—Internet Research, 1999—emeraldinsight.com (Year: 1999).*

Modeling Customizable Web Applications—A Requirements Perspective G Kappel, W Retschitzegger . . . —Proceedings 2000 Kyoto . . . , 2000—ieeexplore.ieee.org (Year: 2000).*

Barkley, Bruce; Saylor, James; Customer-Driven Project Management: A New paradigm in Total Quality Implementation, MacGraw-Hill, 1994.

Standing, Craig, "The Requirements of Methodologies for Developing Web Applications", The 9th European Conference on Information Systems, Jun. 27-29, 2001.

Howcroft, Debra; Carroll, John; "A Proposed Methodology for Web Development", Proceedings of the European Conference on Information Systems, 2000.

Friedlein, Ashley. Web Project Management: Delivering Successful Commercial Web Sites. Morgan Kaufmann: San Francisco (Oct. 2000).

Friedlein, Ashley. Web Project Management: Delivering Successful Commercial Web Sites: Template Project Specification. Version 1.0 (Oct. 2000). Available at www.e-consultancy.com/book.

Ashley Friedlein; Web Project Management: Delivering SUccessfule Commercial Web Sites. Morgan Kaufamnn: San Francisco (Oct. 2000). Chaper 9: Testing, Launch, and Handover (pp. 201-212.

Joel R. Evans et al., "Business-to-Business Marketing and the World Wide Web: Planning, Managing, and Assessing Web Sites", Industrial Marketing Management, vol. 28, pp. 343-358 (1999).

Rolg T. Wigand et al., "Electronic Commerce and User-Based Design of a Web Site: Targeting the Technology Transfer Audience", Journal of Technology Transfer, vol. 22, No. 1, pp. 19-28 (1997).

Heather Tunender, et al., "How to succeed in promoting hyour web site: The impact of search engine registration on retrival of a World Wide Web site", Information Technology and Libraries, search.proquest.com, vol. 173, No. 3, pp. 173-179, (Sep. 1998).

Mike Thelwall, "The responsiveness of search engine indexes" Cybermetrics, searchgate.net, vol. 5, Issue 1, 11 pages, (2001).

Steve. Lawrence, et al. "Accessibility of information on the web", CL Giles-Nature, nature.com, vol. 400, pp. 107-109, (Jul. 8, 1999).

* cited by examiner

METHODS AND SYSTEMS FOR FACILITATING DEVELOPMENT OF WEBSITE PROJECTS

CROSS-REFERENCE TO RELATED APPLICATIONS

This application is a continuation of U.S. patent application Ser. No. 10/194,282 filed Jul. 15, 2002, which claims priority from U.S. Provisional Application Ser. No. 60/304,750, filed Jul. 13, 2001. The entirety of that provisional application is incorporated herein by reference.

BACKGROUND OF THE INVENTION

Field of the Invention

The present invention generally relates to providing business consulting services, and more specifically, to a system and method for providing business solutions to clients via the Internet.

Related Art

Investing in the right e-commerce solution is often bewildering for businesses and individuals. The right solution could transform a company into an industry leader. The wrong solution, however, wastes time, money, and market share. A poorly conceived website attracts little attention and no new business. While the website languishes in the uncharted depths of the Internet, there's also a very real chance that competitors with better websites will lure customers away. There is thus a need for an effective website strategy.

In addition, in a world where rapid technological development is the norm, many websites fail to keep pace with the changing expectations of online customers. The inability to come to terms with new technological developments condemns many websites to failure. Companies must embrace new technologies on their websites and use a dynamic presentation to engage the user. Thus, there is a need for a technologically advanced website strategy.

Entities also need a dynamic and comprehensive e-commerce solution, and at a price well within reach. A website should remember users when they return, and, with an interactive shopping cart system, keep track of the items users want to buy. This familiarity fosters ease-of-use and improves customer loyalty, creating an atmosphere likely to boost sales. What is needed is an opportunity to expand sales through traditional e-commerce, and reduce expense by analyzing the tasks carried out within an organization and applying principles to enhance them. This allows these tasks to be carried out more efficiently and less expensively thanks to the Internet, ensuring major reductions in costs.

In addition, entities need an effective, comprehensive system and method for accessing remote and off-shore products and services. This system and method should ensure that required standards, quality, and processes are met. For example, it is extremely useful for entities that need websites to access website development services in less expensive areas of the world (e.g., India, China). As another example, it is also useful for entities that need to buy a product (e.g., food) or service (e.g., financial services) to access less expensive sellers or sellers in multiple jurisdictions. Currently, it is very difficult to connect a buyer with a seller in other countries, particularly if the country is a third world country. It is also challenging to deliver a quality product complying with the buyer's expectations.

Furthermore, high levels of security are required, ensuring that customers' online shopping experience are simple and safe. Thus, there is a need for a website strategy that incorporates security solutions.

In addition, a website should provide a fully featured administration system that easily allows updating of the range of products offered from the Internet browser, with the ability to add or remove products, change prices or launch special offers at any time of the night or day. Thus, a need exists for a website strategy that incorporates a simple administrative system.

The marketing of a website is also important. Money spent developing an online presence is money wasted if the website existence is generally unknown. An important test of success or failure is the number of users a website attracts. Using this benchmark, the overwhelming majority of websites are failures. The chances of a user finding a website without knowing the uniform resource locator (URL) or being directed there by an external agency are low. Many strategies that work well in the physical world are doomed to fail in the electronic marketplace. Conversely, many techniques that would be far too expensive to contemplate in the "real" world are viable propositions on the net, where a potentially massive global audience is within easy reach. There is thus a need for a website strategy that includes advanced traffic-driving services (e.g., database marketing and search engine registration and optimization) and Internet marketing strategies.

SUMMARY OF THE INVENTION

The present invention meets the above needs in the prior art by providing business solutions that are effective, include technological advances, utilize e-commerce, offer secure solutions, are simple to administer, incorporate Internet marketing strategies, and provide means for effectively accessing remote (e.g., offshore) products and services. In an embodiment of the present invention, a host helps connect a client (e.g., Canada, the United States) with a developer in a less expensive area (e.g., India, China) with a high profile, state-of-the-art, customized, online website. In other embodiments of the present invention, a host helps connect a client with a product or service (e.g., food, computer hardware, toys) offered in a less expensive area.

The present invention incorporates a high-efficiency development model. This model has been developed through identifying common components that comprise different client solutions. By breaking out these components and refining them into functional modules that can deliver high functionality, developers around the world can rapidly develop Internet solutions without writing programming code from scratch for each solution. Since each module is developed with great planning and attention to detail, the functionality of these modules meets and exceeds most client requirements. In addition, the model demonstrates great efficiency by using a standardized format for submitting site requirements and content (e.g., a functional design).

For example, in one embodiment an Internet Consultant (IC) (e.g., independent contractor or employee of a host company) contacts a potential client, completes a business analysis by obtaining information about the client's company and desired website components, and creates a proposal. The client accepts the proposal and the IC and the client define functional modules (e.g., a functional design) tailored to the client so that the host can connect the IC and the client with a programmer (e.g., in a less expensive area) that can create the customized website. Those experienced in the art will realize that the programmer can be a host employee, an independent contractor, or another entity. The business analysis, proposal, and defined functional modules are based upon defined common components that the host has compiled. This is important because when a website is developed off-shore, a major challenge is ensuring that client requirements have been adequately documented, thereby dramatically reduces errors and downtime. The IC and host are versed in a blueprint language so that each party can quickly communicate and assess the components, features, and content of the website. As the architect and the construction worker communicate through shared drafting standards and norms, the functional design accomplishes the same task between the client and the developer of Internet solutions.

Internet solutions are developed and delivered with building blocks that can be rapidly assembled by developers, ensuring that development times are minimized and the solution is highly cost efficient for the client. This allows the present invention to offer levels of quality, functionality, and cost effectiveness to clients that is unmatched globally.

The present invention gauges the needs and provides solutions to help a client better do business on the Internet. The present invention works with the client to use practical tools and marketing solutions on the Internet to grow the client's business.

The system and method of the invention provide ICs with an effective and efficient way of delivering specialized business solutions to their clients via the Internet. The system includes a terminal and a server that are operationally connected to each other through couplings and a network (e.g., the Internet).

In an embodiment of the invention, a method for delivering specialized business solutions is provided that includes six phases, each of which is completed before moving on to the next phase.

The first phase is the business analysis phase, during which an IC and/or host establishes rapport with a prospective client and creates a business strategy for a network, such as the Internet, for the client by researching the client business and market.

The second phase is the functional design phase, during which the IC gathers the client's information to create a network website, including all of the client's functional requirements.

The third phase is the building phase of the website, during which coding and database integration for the website are produced in accordance with the functional design phase.

The fourth phase is the testing phase of all the functional requirements of the website to ensure that they meet the client's requirements.

The fifth phase is the launching phase, which places the website live on a server and registers the website with all appropriate search engines to optimize traffic levels. All client internal and operations processes associated with the website are also implemented and validated during the launching phase.

The sixth phase is the managing results phase, during which the IC and client meet at regular intervals to review website traffic, to understand which components of the website are successful and which areas may need further review, and to implement marketing and promotional activities. The IC and client can also identify potential subsequent enhancements to the website during the managing phase.

The features and advantages of the present invention will become more apparent from the detailed description set forth below when taken in conjunction with the drawings in which like reference numbers indicate identical or functionally similar elements.

BRIEF DESCRIPTION OF THE FIGURES

FIGS. 14-43 are screen shots illustrating use of the system 100 and method 200, according to an embodiment of the present invention.

DETAILED DESCRIPTION OF THE INVENTION

The present invention relates to a system, apparatus, method and computer program product for providing website business solutions to clients via the Internet.

In an embodiment of the present invention, a host organization provides and allows access to a tool that enables clients to order and receive website business solutions via the global Internet. That is, the service provider would provide the hardware (e.g., servers) and software (e.g., database) infrastructure, application software, customer support, and billing mechanism to allow its ICs (e.g., independent contractors, host organization employees) to create guidelines for effective and efficient Websites for clients. The tool is used by the host to create websites based on the guidelines.

The level of detail collected by the present invention, which has not been seen in any conventional systems, allows ICs the ability to effectively and efficiently provide customized website solutions to clients.

In an embodiment of the present invention, the host provides a World Wide Web site where an IC, using a computer and Web browser software, can remotely view and receive host information, in addition to submitting information to the host.

In an alternate embodiment, the tool that provides website business solutions resides, instead of on the global Internet, locally on proprietary equipment owned by a host as a stand alone system software application.

The present invention is described in terms of the above examples. This is for convenience only and is not intended to limit the application of the present invention. In fact, after reading the following description, it will be apparent to one skilled in the relevant art(s) how to implement the following invention in alternative embodiments.

The terms "user," "subscriber," "customer," "company," "business concern," "broadcaster," "corporate advertiser," "advertising agency," and the plural form of these terms are used interchangeably throughout herein to refer to those who would access, use, and/or benefit from the tool that the present invention provides.

System Overview

Figure 1:
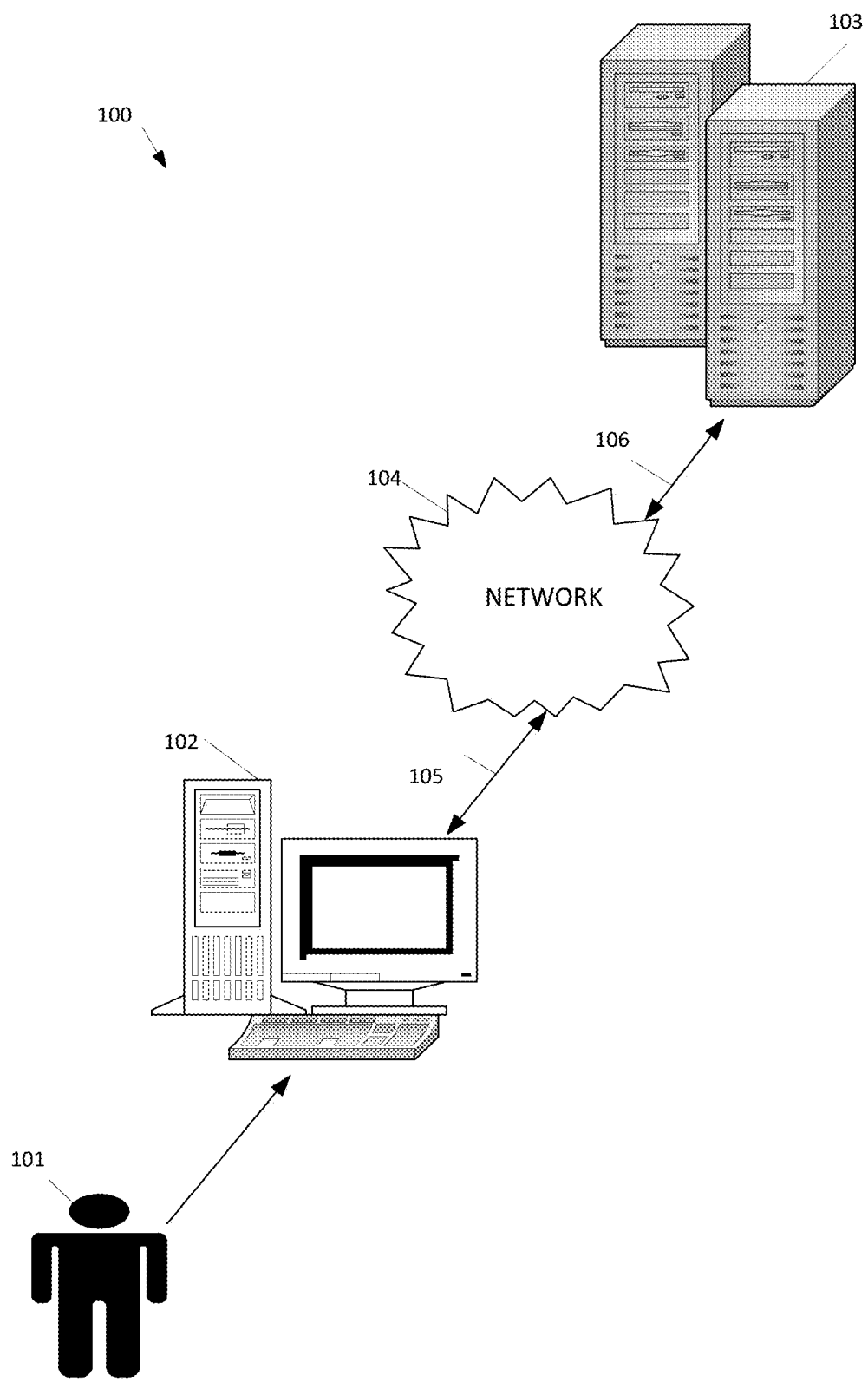
FIG. 1 illustrates an overview pictogram of system elements in accordance with an embodiment of the present invention.

FIG. 1 illustrates an overview pictogram of system 100 elements in accordance with an embodiment of the present invention. The system of the invention provides one or more ICs 101 with an effective and efficient way of delivering specialized business solutions to their clients via the Internet. The system includes a terminal 102 and a server 103 that are operationally connected to each other through couplings 105, 106, and a network 104 (e.g., the Internet). Terminal 102 includes a user interface to capture information on the client, client business, client market, and client's functional requirements; a memory, operationally coupled to the user interface, to store the captured client's information and functional requirements; and a processor, operationally coupled to a user interface and memory, to create a business strategy and specialized business solutions for the client based on the client's information and functional requirements. The server 103 delivers the business strategy and specialized business solutions to the client via network 104.

In this embodiment, the website developer is an employee of the host, and is thus described as the host. In alternative embodiments, the website developer could be an independent contractor, a company different from the host, or another entity.

Method Overview

Figure 2:
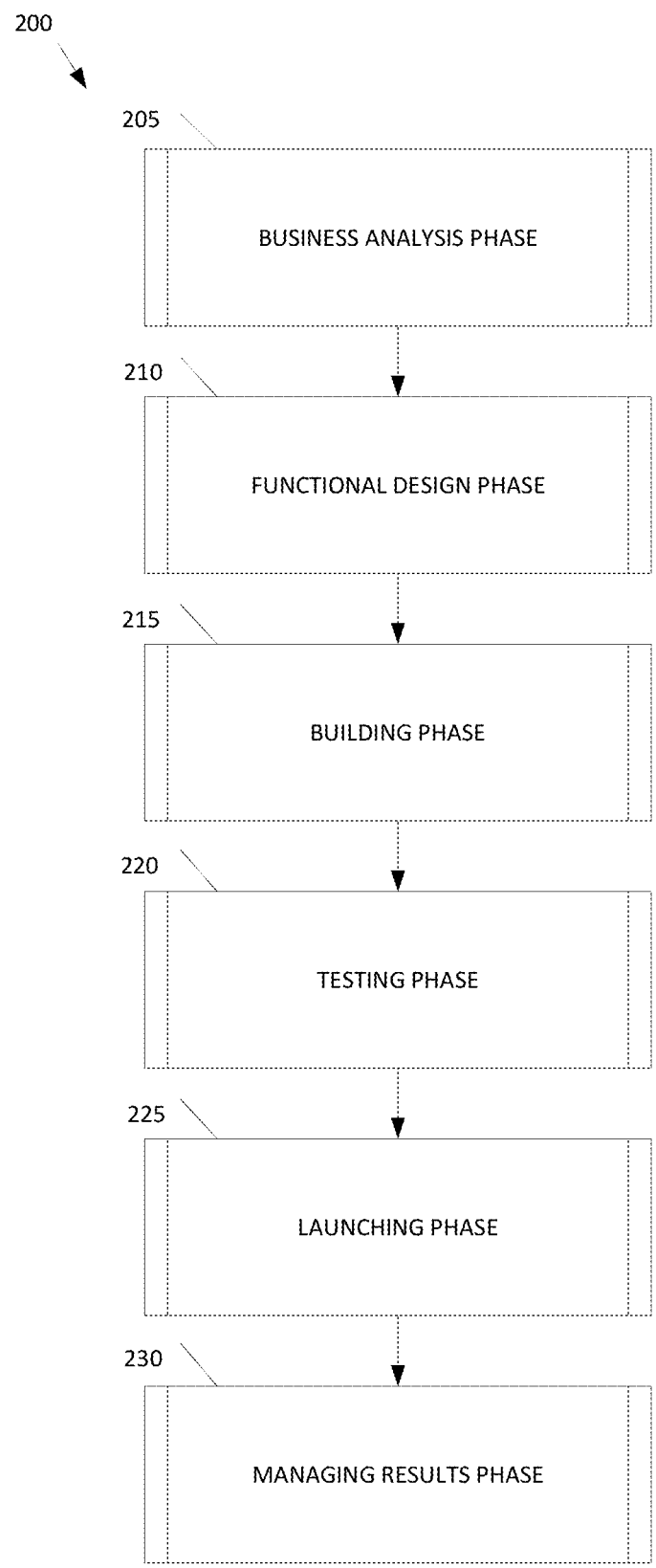
FIG. 2 illustrates an overview of the method for delivering a specialized Internet business solution website to a prospective client, in accordance with an embodiment of the invention.

FIG. 2 illustrates an overview of the method for providing website business solutions to clients, in accordance with an embodiment of the invention. In step 205, a business analysis is completed by questioning the client, analyzing the client's responses, and preparing a client proposal during the business analysis phase. In step 210, the business analysis is incorporated into a functional design during the functional design phase. In step 215, a website is built using the functional design specifications and solutions/code during the building phase. In step 220, the website is tested by the IC and the client during the testing phase. In step 225, the website is launched during the launching phase. In step 230, the website is managed during the managing results phase.

Business Analysis Phase

Figure 3:
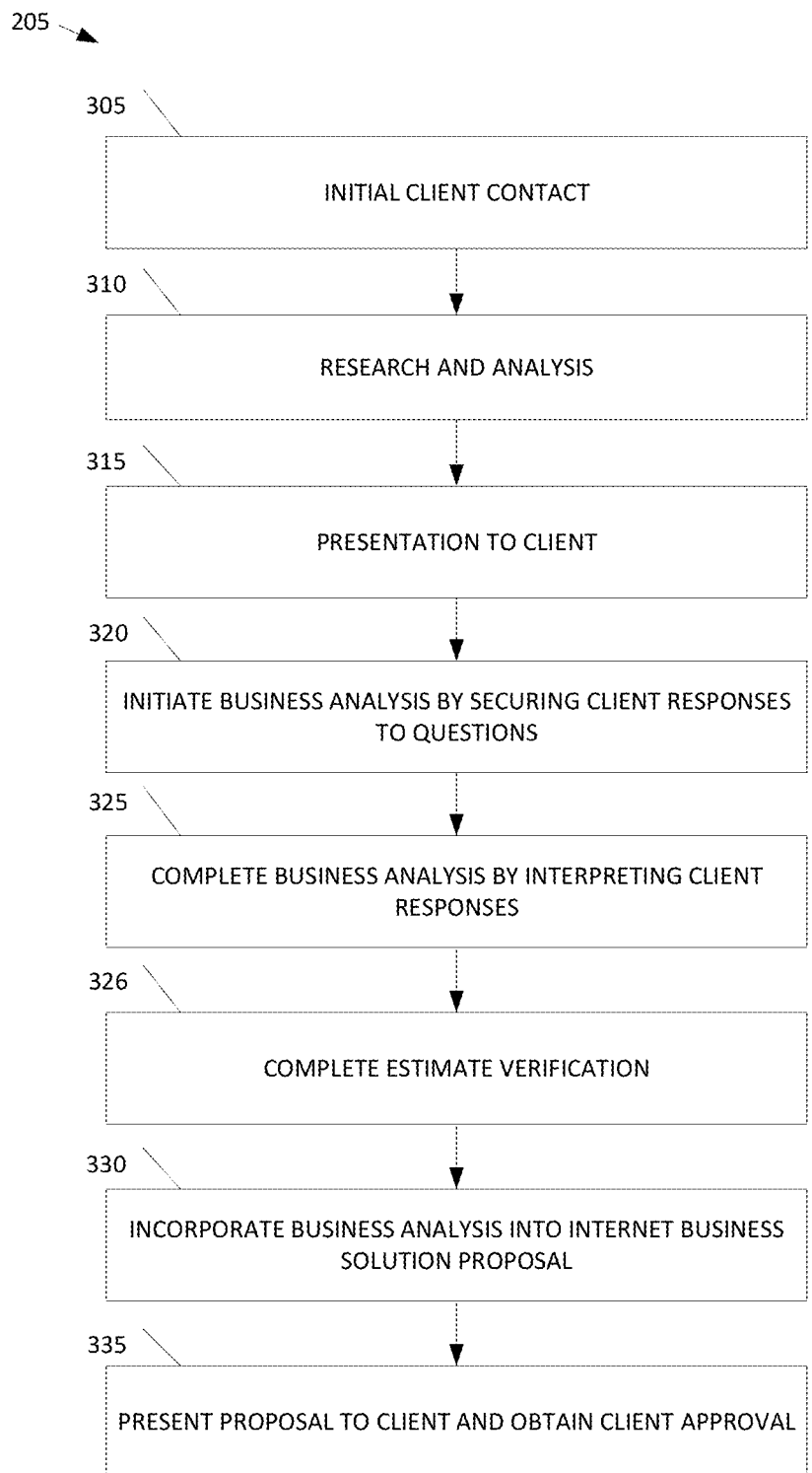
FIG. 3 is a flowchart illustrating business analysis phase 205, according to an embodiment of the present invention.

FIG. 3 is a flowchart illustrating business analysis phase 205, according to an embodiment of the present invention. The present invention, in order to optimize a client's Internet marketing strategy, employs an Internet business analysis. The business analysis offers a comprehensive overview of an entity's current status. As part of the business analysis, a company's internal workings are thoroughly examined with a view to improving internal efficiencies and streamlining business systems. The business analysis, however, also looks at the company in a broader market context, clearly identifying competitive advantages and target markets, and suggesting ways to increase customer loyalty and retention. By providing the benchmarks by which a website's success can be measured, the business analysis allows the tailoring of an Internet business strategy designed to produce significant return on investment.

In step 305, the host or IC makes an initial client contact. This can be through a host website or some other contact (e.g., a telephone call or letter from the IC). For example, the host can post information on the website explaining the method 200, and asking for client information. The client information can include, for example, contact information, goals and objectives for the client's website (e.g., lead generation, sell products/services to defined market, automate current business practices), websites that have appealed to the client, current client website information (if any), and aspects of a business analysis that interest the client (e.g., how the Internet can increase company revenue, how a client can realize a return on an Internet investment, how to sell products/services to a predefined market, how to decrease company costs by streamlining business functions; how improved business efficiencies will add to business time management).

In step 310, the IC completes initial research and analysis. The research and analysis can include client research (e.g., key decision makers, company size, news events affecting the company, key clients), market research (e.g., target market, key industry terminology and trends, key competitors, industry challenges), Internet research (e.g., host-developed websites in the same industry, current client website and its effectiveness, news events regarding how the Internet is affecting the client's industry), and documentation of the research.

In step 315, the IC makes a presentation to the client, explaining the host's service and the business analysis. In step 320, the IC initiates an Internet business analysis by securing client responses to questions related to a desired client website (e.g., Internet familiarity, business practices, and desired Internet features). The business analysis can include, but is not limited to, the following: the company's selling points, sources of growth, competitor information, customer business cycles, business challenges, business accomplishments, network organizations, company publications, mailing list information, marketing information, products or services for sale, promotional information, company branded positioning, customer service information, and customer relationship cultivation information.

In step 325, the IC completes the business analysis by interpreting the responses to the business analysis questions using an IC guide. The IC guide provides explanations for the answers desired and received from the business analysis questions.

In optional step 326, an estimate verification is completed. The estimate verification is accessed online, and enables the IC to communicate questions regarding functionality, unique customizations, or feasibility requests to the host before obtaining a signed contract with the client. This enables the IC to obtain accurate information (e.g., pricing, delivery time) for the proposal.

In step 330, the host incorporates the business analysis into an Internet business solution proposal. The Internet business solution proposal outlines the general and specific possibilities and opportunities the host can offer to the client. The Internet business solution proposal also includes a detailed pricing breakdown and a proposed timeline. The Internet business solution proposal can include, but is not limited to: Internet benefits, consultant services, Internet solutions overview, corporate information and identity, e-commerce solutions (e.g., personal shopping cart technology, sales management tools), product or service presentation, customer communication information, business-to-business commerce, internal communications, customer service, marketing, multimedia website/Internet infrastructure maintenance, training, and pricing.

In step 335, the IC presents the Internet business solution proposal to the client and obtains client approval to proceed with the proposal.

Functional Design Phase

Figure 4:
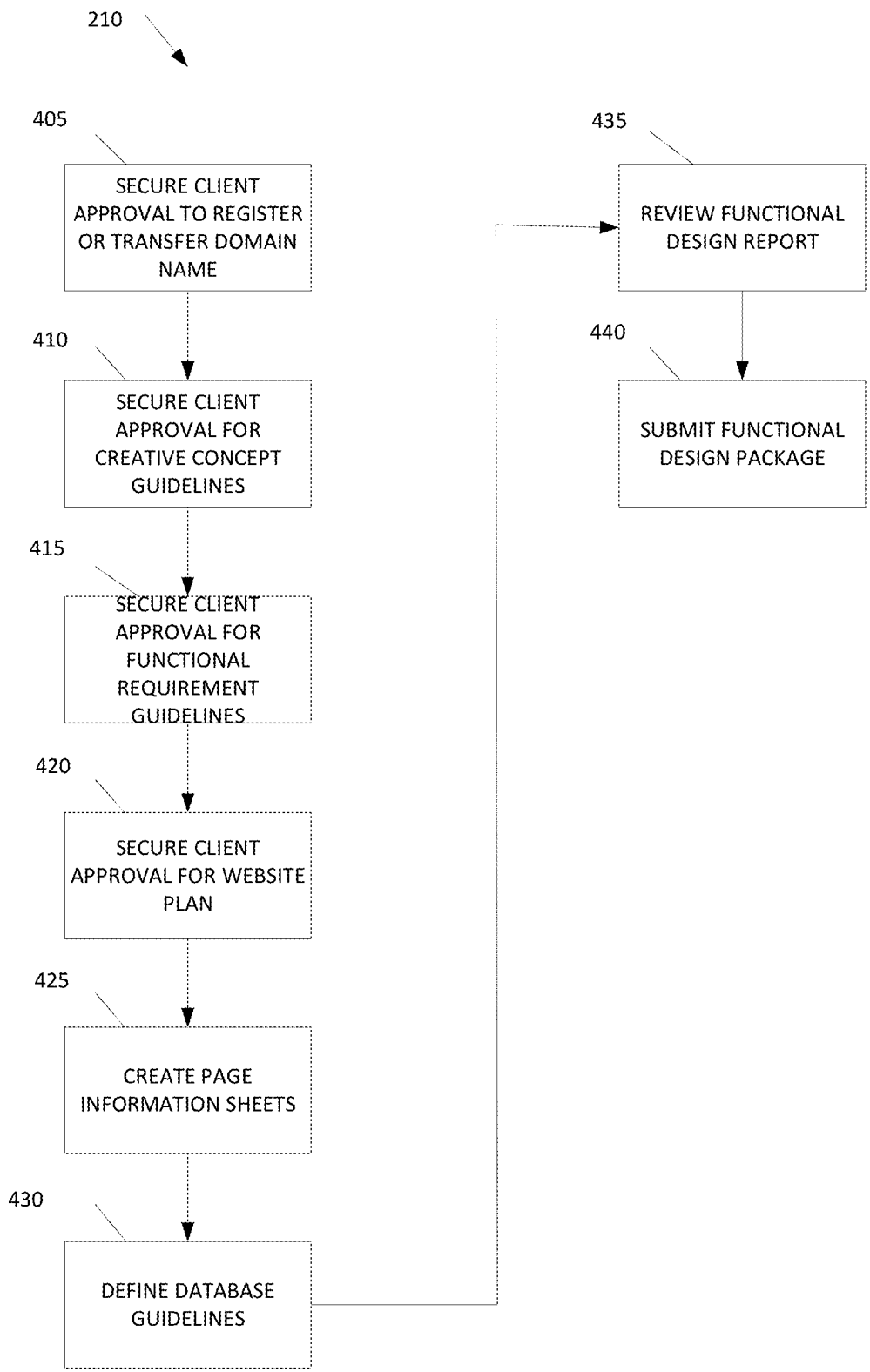
FIG. 4 is a flowchart illustrating functional design phase 210, according to an embodiment of the present invention.

FIG. 4 is a flowchart illustrating functional design process 210, according to an embodiment of the present invention. In step 405, the IC secures client approval to register or transfer the client's domain name. In step 410, the IC secures client approval for creative concept guidelines, which controls how the website will look. In step 415, the IC secures client approval for functional requirement guidelines, which are the specific activities and experiences available to the client or a surfer when using the website. In step 420, the IC secures client approval for a website plan, which is partially based on the functional requirement guidelines. In step 425, the IC creates page information sheets identified in the website plan. The specific details of each page are documented to communicate required information to the host. The IC may draw from a storehouse of established page information sheets to streamline IC and host activities. In step 430, the IC defines database guidelines, which enable communication of known, specific data fields and their logistical groupings that are required for display and functionality within the website. In step 435, the IC reviews a functional design report, which can also be used throughout the functional design process to gather and document which parts of the functional design process have been completed. The functional design report is a summary or checklist that ensures a complete submission of data and thus helps avoid project delays. In step 440, the IC submits the functional design package to the host. In an alternative embodiment, the host and IC can access a mail feature that enables communication throughout the functional design process.

The functional design can be completed online or offline. When online, in an alternative embodiment, the IC has the option to access other features. The IC may save documentation and archive this documentation for future access, in case similar jobs are completed in the future. In addition, the IC has an online ability to access a knowledge base of previously submitted functional designs, in case similar jobs have already been completed. Furthermore, when online, the IC draws from a storehouse of standard website plans, providing greater efficiency to the process. The IC then has the option to modify and re-upload, if needed.

Creative Concept Guidelines.

Figure 5:
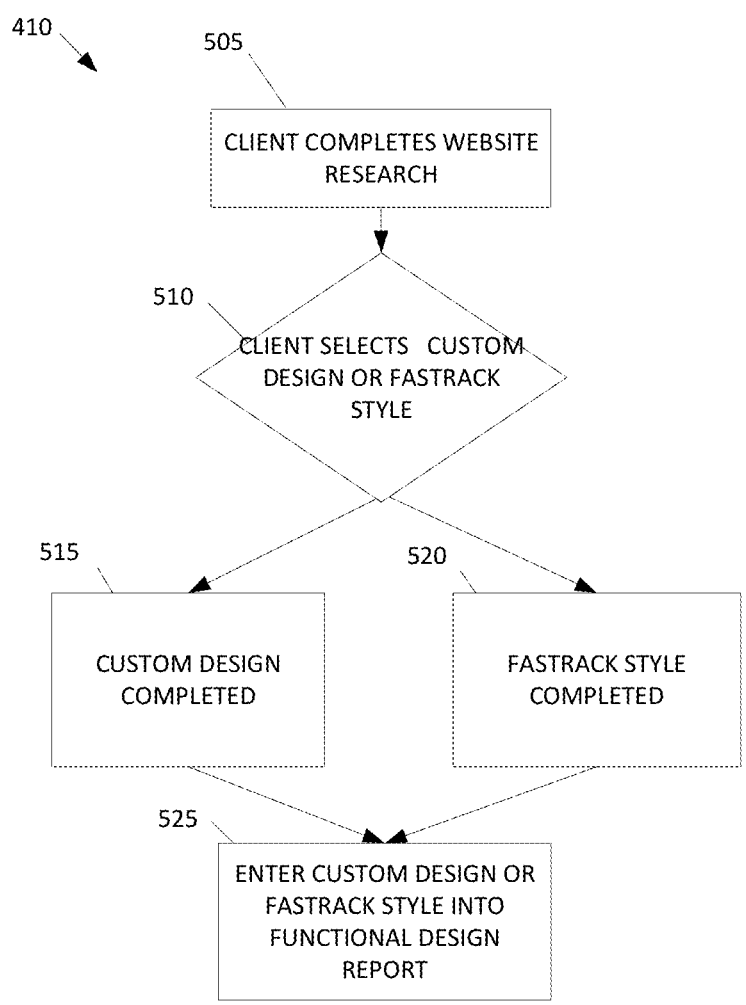
FIG. 5 is a flowchart illustrating creative concept guideline process 410, according to an embodiment of the present invention.

FIG. 5 is a flowchart illustrating creative concept guideline process 410, according to an embodiment of the present invention. The creative concept guidelines are defined to help the host and client communicate the look, feel, and style concepts of the website. In step 505, the client completes website research utilizing IC guidelines, identifying, for example, existing preferred websites and styles.

In step 510, the client selects a custom design or fastrack style project path. The custom design allows the client to provide guidelines for a custom website. These guidelines are based on defining a client's approach to the market and reviewing a variety of website styles. The fastrack style allows the client to select among different predesigned styles, colors and layouts created by the host. The fastrack style often results in faster production of the website because custom work is not done and client approvals for the custom design are eliminated.

If the custom design path is selected, a custom design is completed in step 515. If the fast-track style path is selected, at least one fast-track style is chosen in step 520. In step 525, the custom design or at least one fast-track style is incorporated into the functional design report.

Functional Requirement Guidelines.

Figure 6:
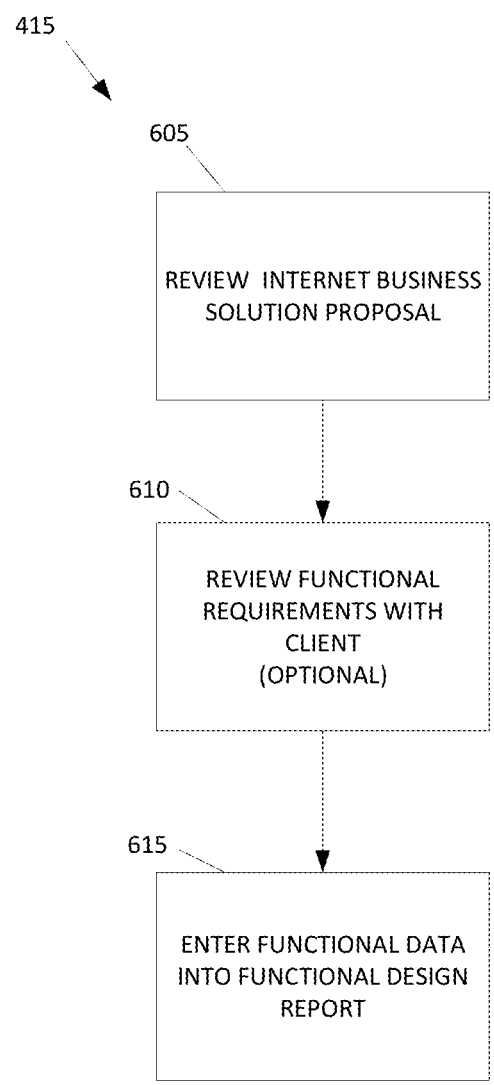
FIG. 6 is a flowchart illustrating functional requirement process 415, according to an embodiment of the present invention.

FIG. 6 is a flowchart illustrating functional requirement process 415, according to an embodiment of the present invention. The functional requirements include the specific activities and experiences available to the client or the surfer when using the website. Functional requirements include, but are not limited to: specific Internet applications (SIAs) (e.g., customized and fastrack virtual agency, virtual restaurant, digital dealership, world merchant system); Internet marketing tools (dynamic information system, login system multiple users, file download link, standard form, web board/chat, guest book, online employment system, form based auto responder, text editor, intuitive marketing technology—cookies, dynamic survey system, scrolling marquee, image managers, document management system); creative services (e.g., concept draft, single pages, 360 degree panoramic imaging and hot spot; pop-ups/thumbnail imaging, mouse over, animated text, animated GIF, logo design, individual banner design, corporate identity); database table integration (e.g., database table, database content editors, database search, file upload); production center specific products (e.g., dynamic concept draft, categories, banner system, under construction page, email stationary, 360 imaging, concept draft; corporate bid consulting; multiple fastrack styles, fastrack flash banners, fastrack static banners, educational information system, web board, vertical scrolling marquee, HTML editor, horizontal image scroller, vertical image scroller, event scheduling system, flash options, job information, guest book, forum, e-marketer, virtual travel agency, floating banner, shopping cart, info-links, concept drafts); multi-media and special services (e.g., shockwave/flash); and e-commerce products (e.g., world merchant system, credit card processing system). In another embodiment, package specials, which combine multiple functions into pre-set packages with reduced price, are also offered. In a further embodiment, miscellaneous services (e.g., project management services, design or development services, database analysis, technical management services) are also offered.

In step 605, the IC reviews the client Internet business solution proposal to determine which functional requirements the client desires. In step 610, which is optional, the IC can again review with the client each functional component of the website. For example, one function is to provide sensitive product data access to customers.

In step 615, functional data is entered into the functional design report. For each functional requirement or business event, the function or event is broken down into the specific steps required to achieve the function. For example, if the function is to provide sensitive product data access to customers, the specific steps are: selecting product information retrieval function; entering user name and password to access information; accepting/rejecting user name and password; submitting search or product documentation on a specific subject; presenting product list to select from; and selecting an appropriate listed item for viewing.

Website Plan.

Figure 7:
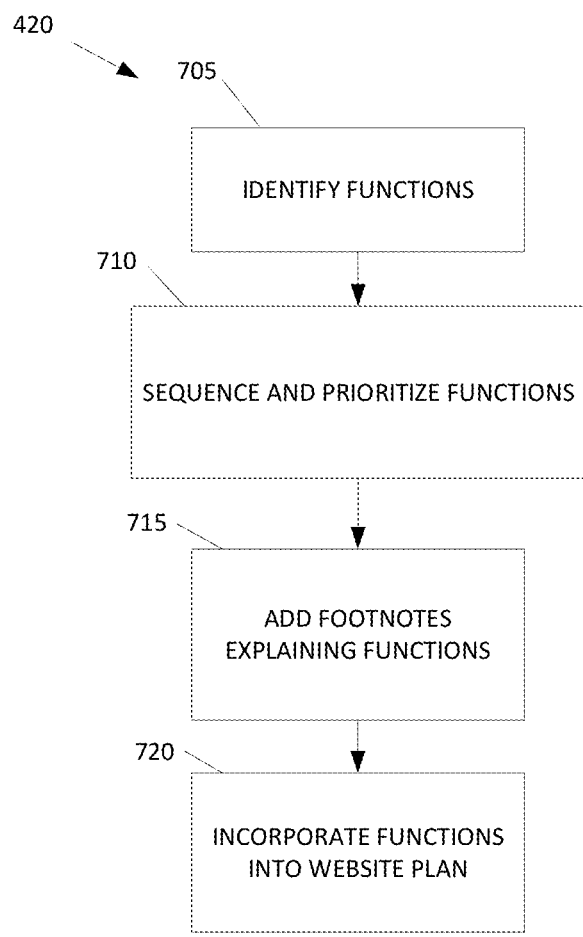
FIG. 7 is a flowchart illustrating website plan process 420, according to an embodiment of the present invention.

FIG. 7 is a flowchart illustrating website plan process 420, according to an embodiment of the present invention. The website plan communicates the page structure of the website to the host, organizing information into logical groups and functions. In step 705, the key functions of the website are identified and grouped. In step 710, each major function is divided into logical steps, and the priority of each function is determined. For example, information on products is presented through categorization, where the IC indicates that categories should be displayed first, then products, then product details.

In step 715, footnotes are added to explain functions or conditions for navigation from one page to the next. In step 720, the function information is incorporated into website plan. In an embodiment of the present invention, the website plan is adjusted to comply with host standards. For example, the website plan could be adjusted to meet certain margin, typeface, and organizational chart requirements. In step 730, the website plan is sent to the host to help confirm IC and client expectations regarding how the website is to be administered.

Page Information Sheets.

Figure 8:
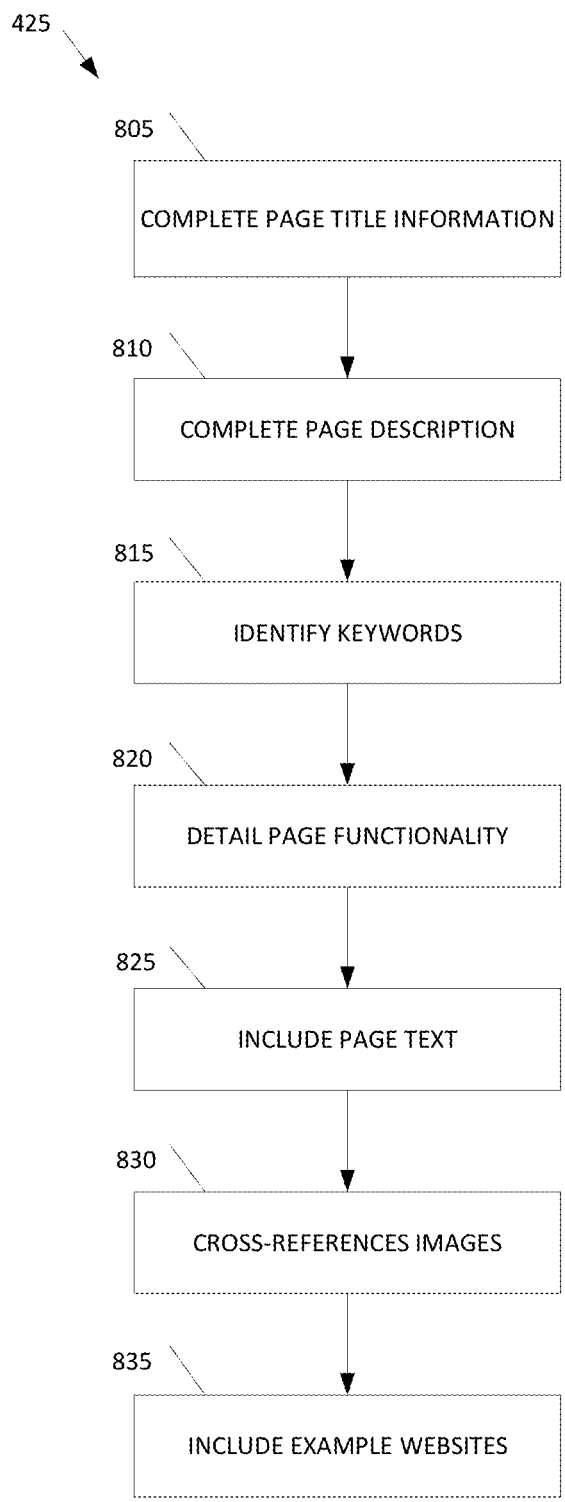
FIG. 8 is a flowchart illustrating page information sheet process 425, according to an embodiment of the present invention.

FIG. 8 is a flowchart illustrating page information sheet process 425, according to an embodiment of the present invention. Creation of the page information sheets can occur in tandem with the website plan creation. The page information sheets document the specific details of each page for the host, and include all the media to appear on a specific page, including direct documentation of text, cross reference of graphics files, and descriptions of all page functions.

In step 805, the page title information is completed. The title of the page, which includes keywords, should be as descriptive as possible. In step 810, the page description is completed. The page description accompanies the page title on results listings from search engines and may influence a surfer to enter the page when reviewing search engine output listings. In step 815, keywords or keyphrases are identified. In step 820, the functionality of each page is detailed. These requirements help the host make the page, and are a key component of documentation in the testing process. In step 825, the text that will appear on the page is included. In step 830, all image files that will be displayed on the page are cross-referenced. In step 835, example websites are included to help the host understand the client's desired page design, layout or functionality are documented.

Database Guidelines.

Figure 9:
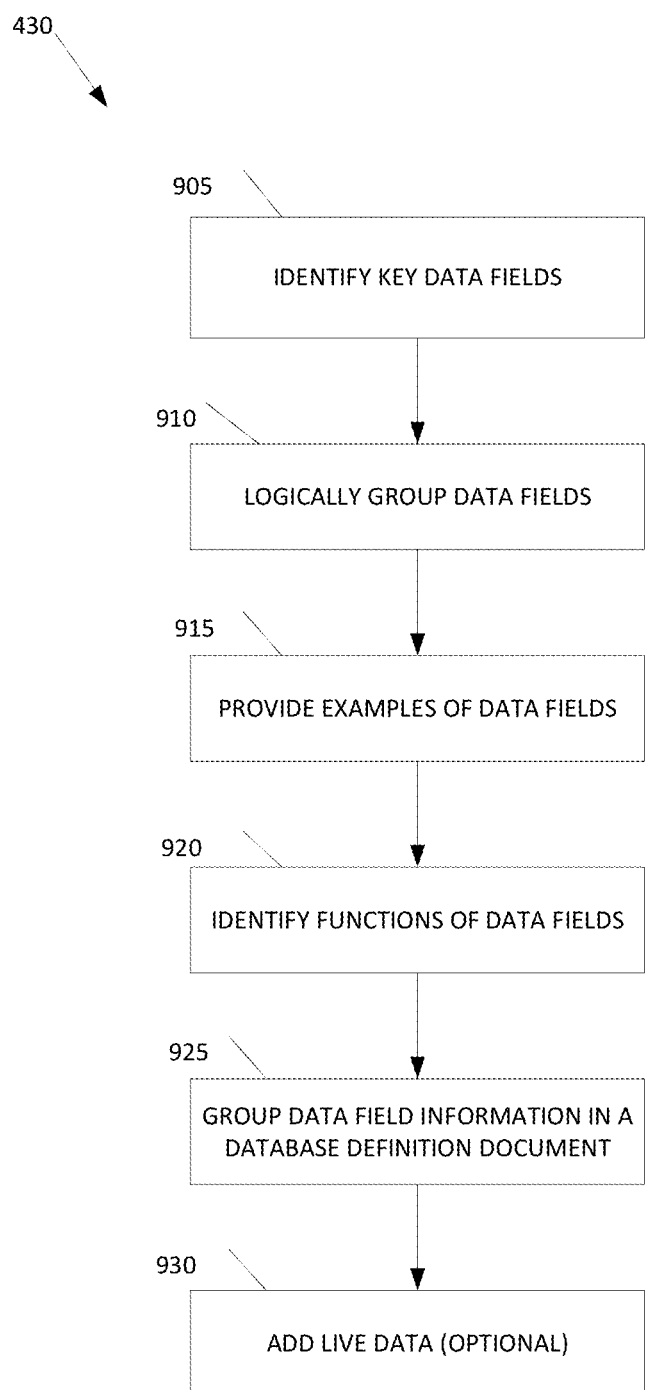
FIG. 9 is a flowchart illustrating database guideline 430, according to an embodiment of the present invention.

FIG. 9 is a flowchart illustrating database guideline process 430, according to an embodiment of the present invention. The database element guidelines enable the IC to communicate specific database requirements for display and to drive functions within the website.

In step 905, the key functions defined within the functional design guidelines and the website plan are used to identify the key data fields. In step 910, the data fields are logically grouped to help communicate the data structure to the host. In step 915, examples of each data field are provided so that the host can better understand the desired data structure.

In step 920, the specific functionality of each data field is explained to communicate how the data should be structured and how the data should be presented. In step 925, the data field information is grouped in a database definition document. In optional step 930, live data is added. If there are large quantities of data that require uploading to the database prior to a website going live, the IC can attach all client data in a separate spreadsheet. This data can be used in testing and can be available immediately when the website goes live.

Functional Design Summary Report.

The functional design summary report is reviewed to make sure the core pieces of the functional design (e.g., creative concept guidelines, functional requirement guidelines) are completed.

Screen Shots.

Figure 14:
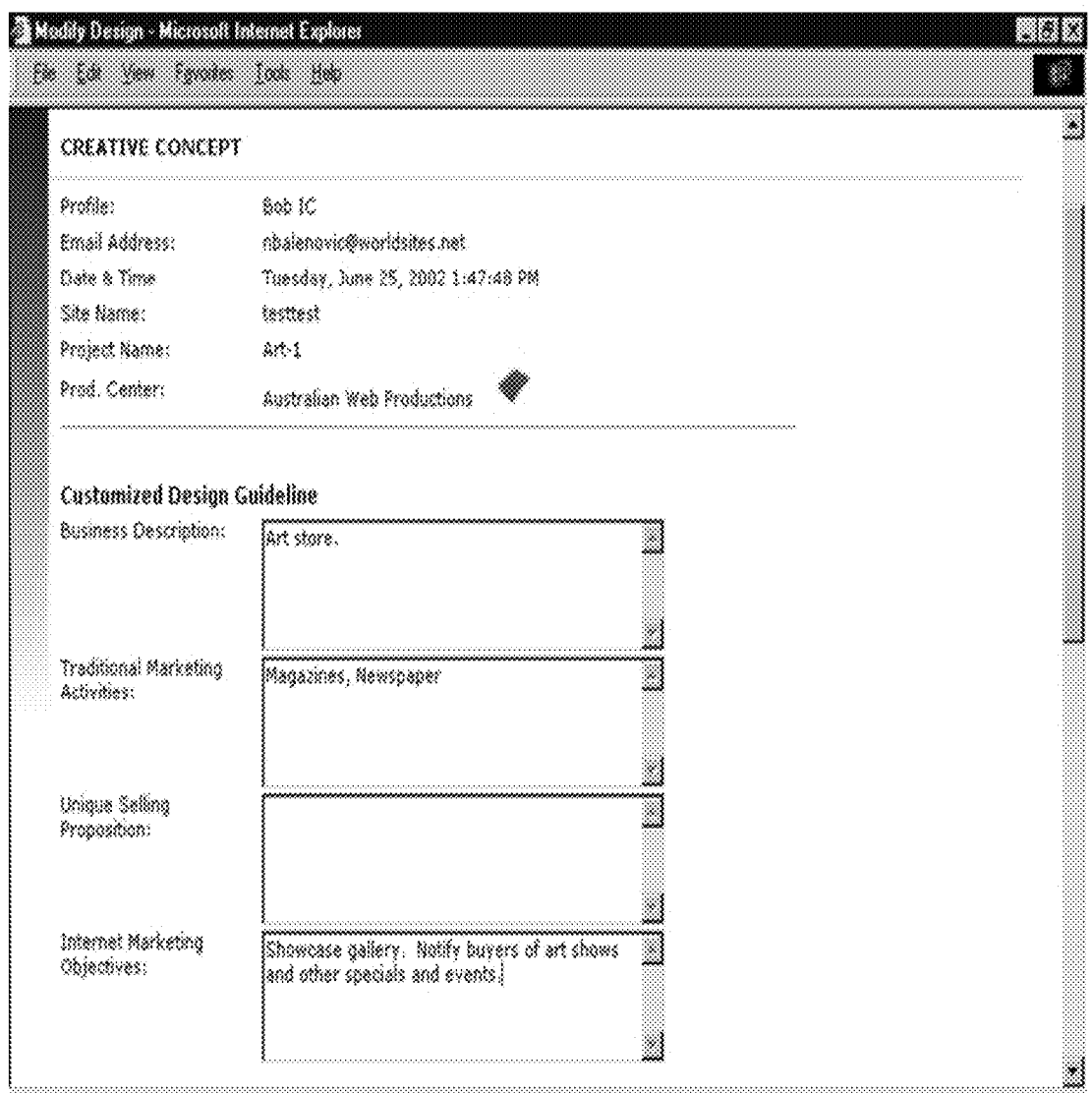
Figure 15:
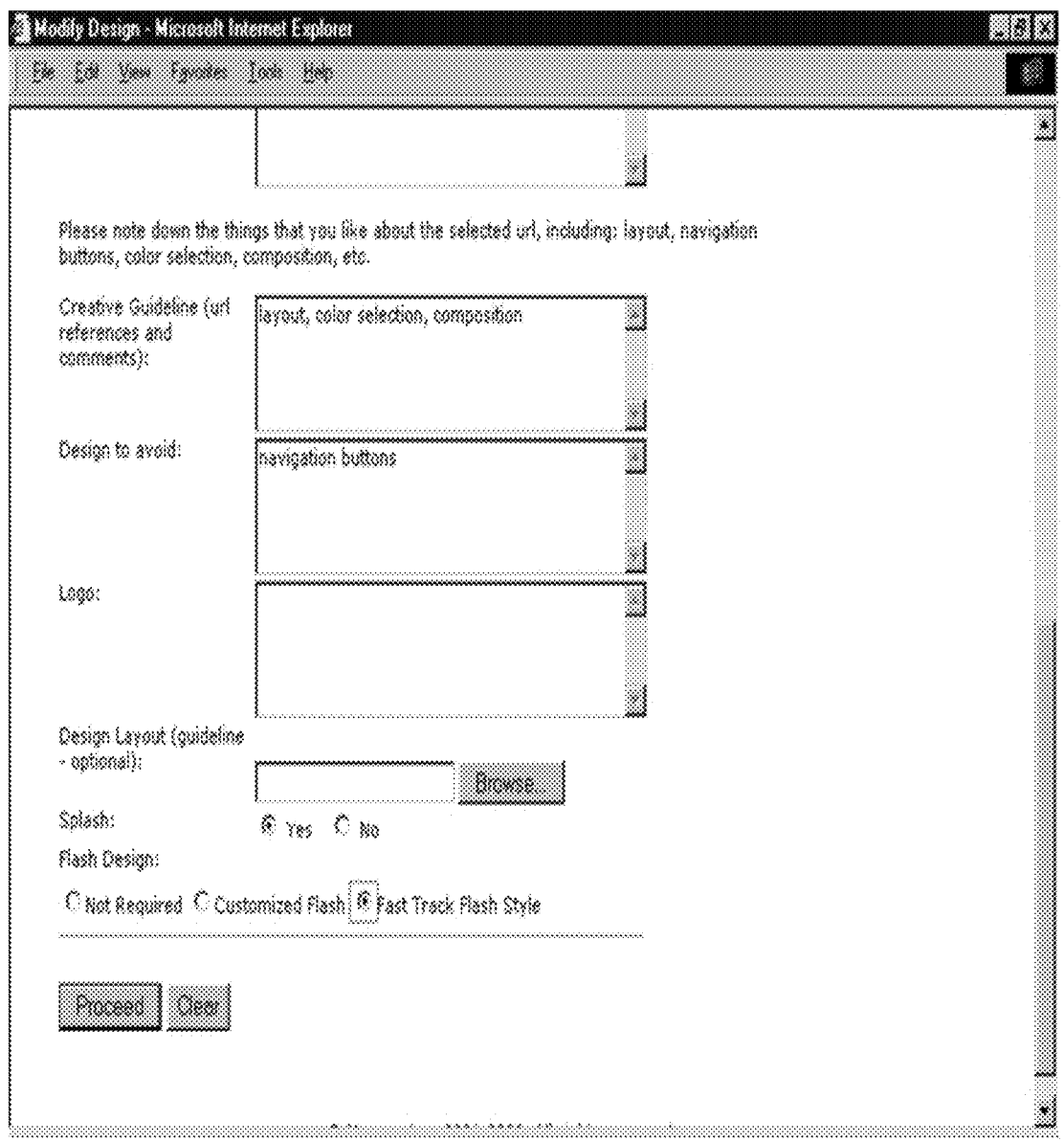
Figure 18:
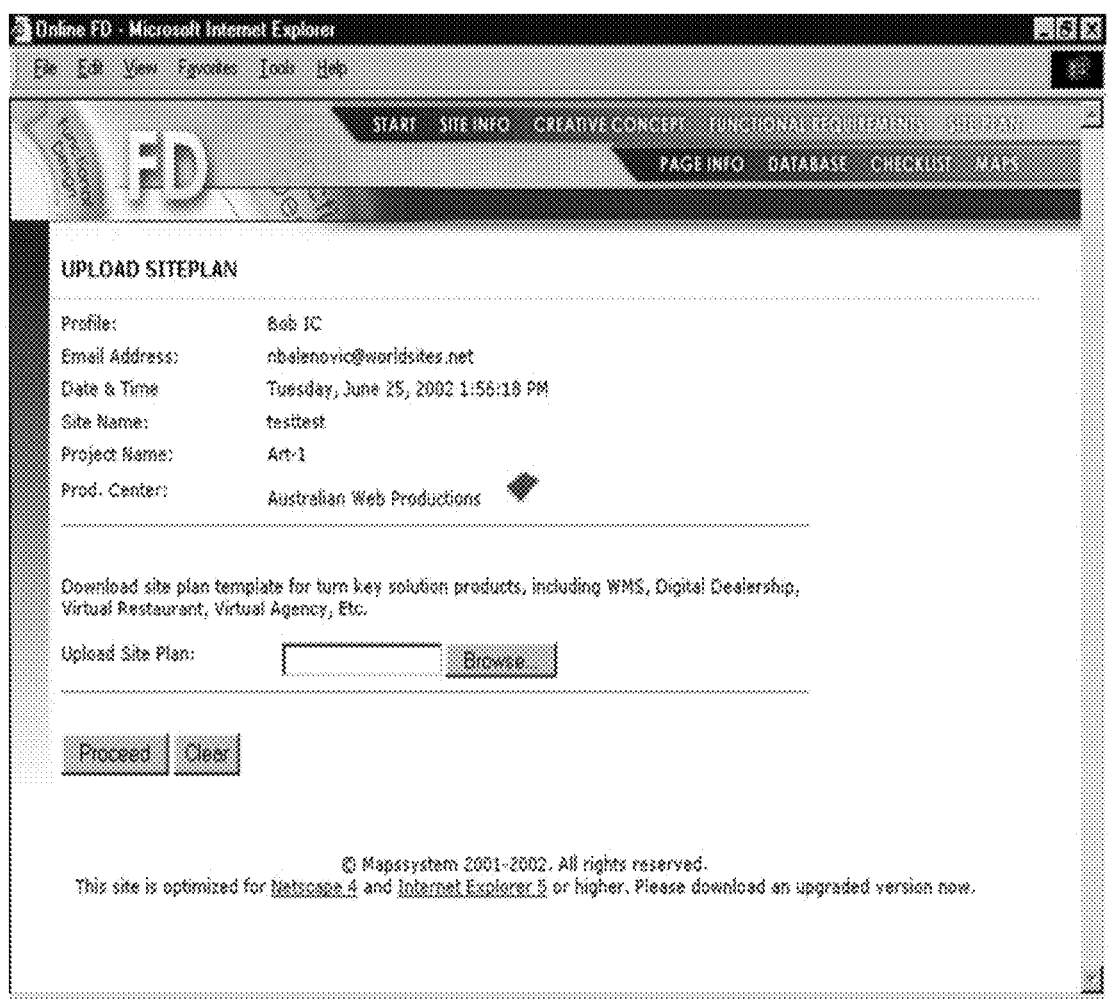
Figure 19:
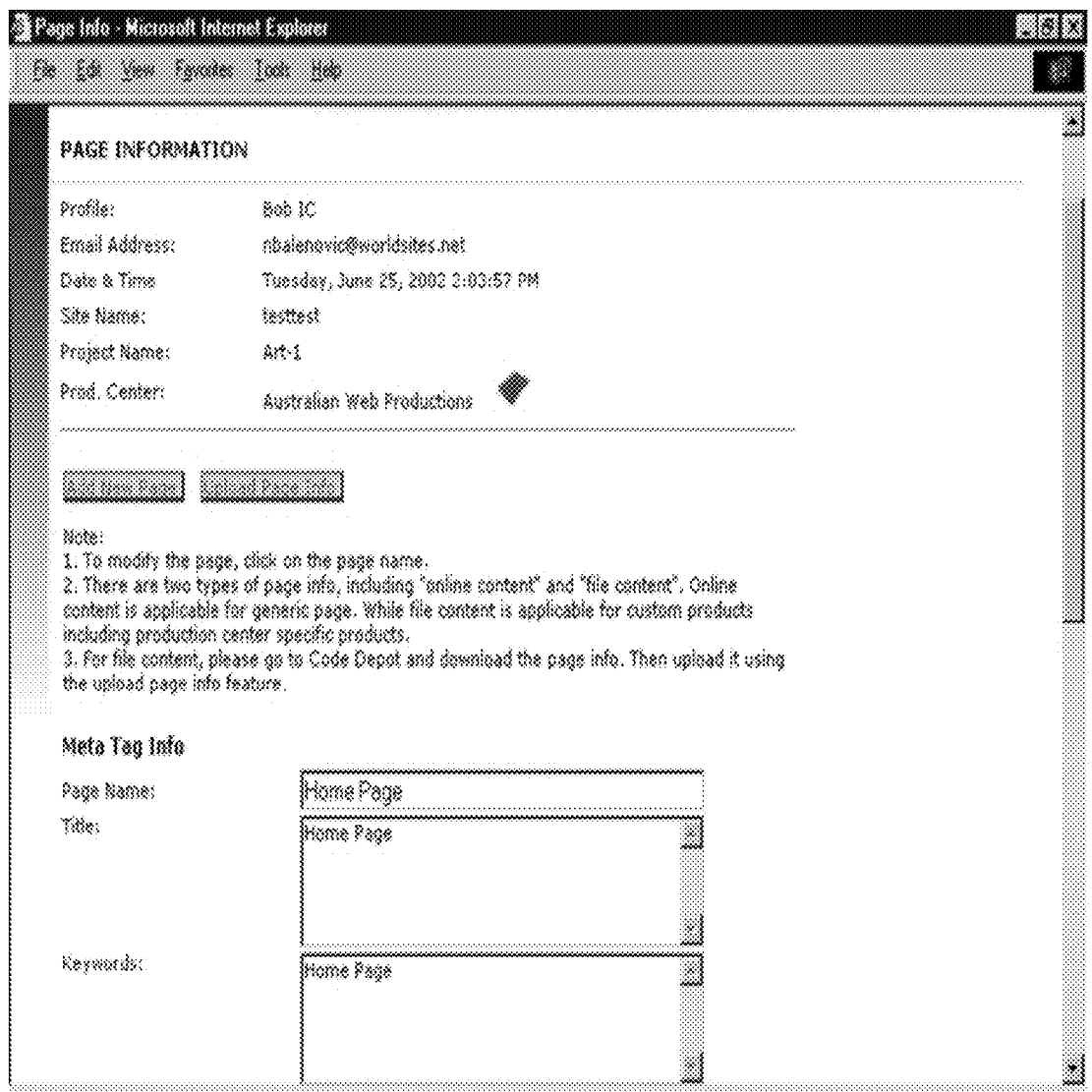
Figure 20:
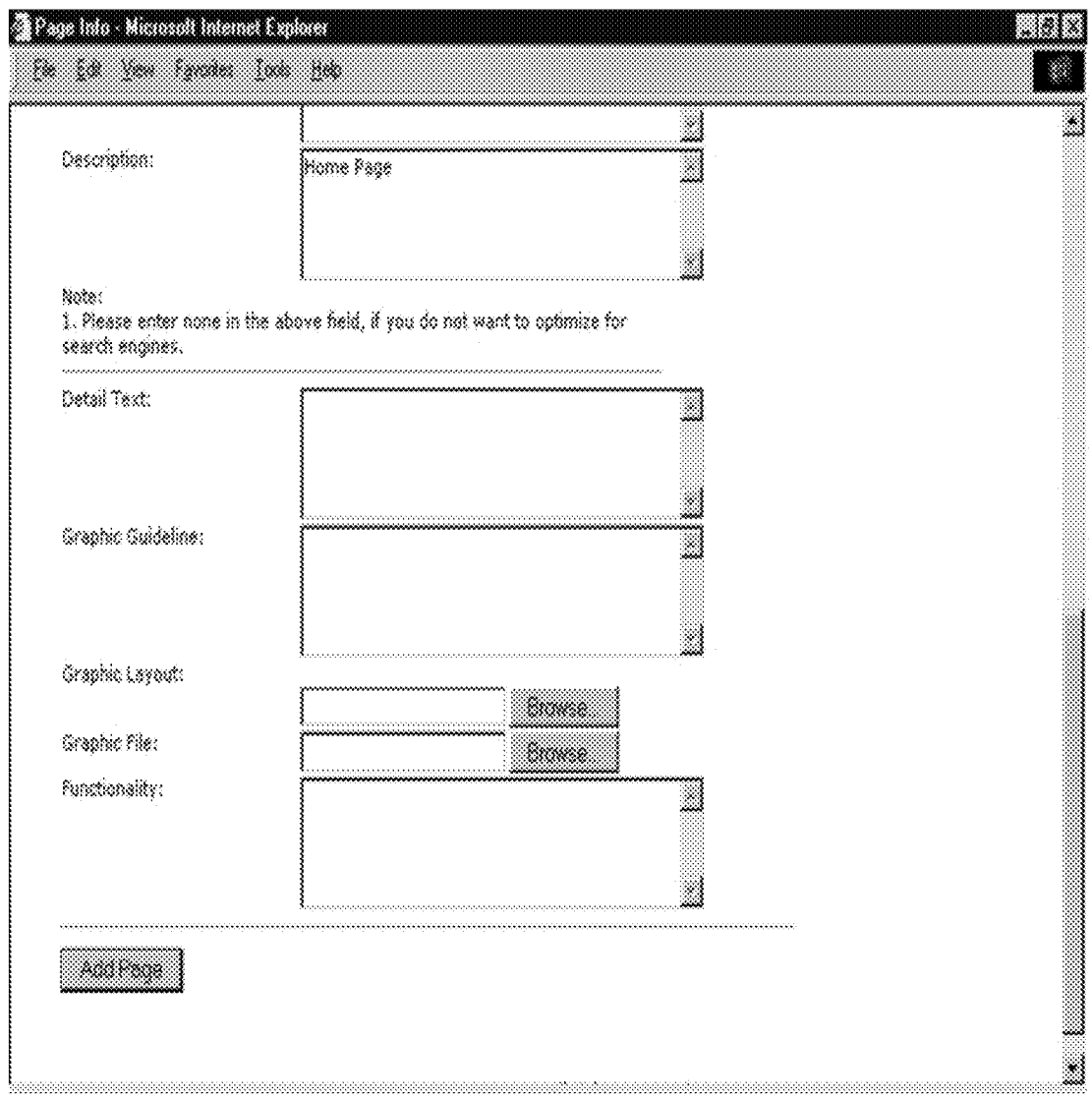
Figure 22:
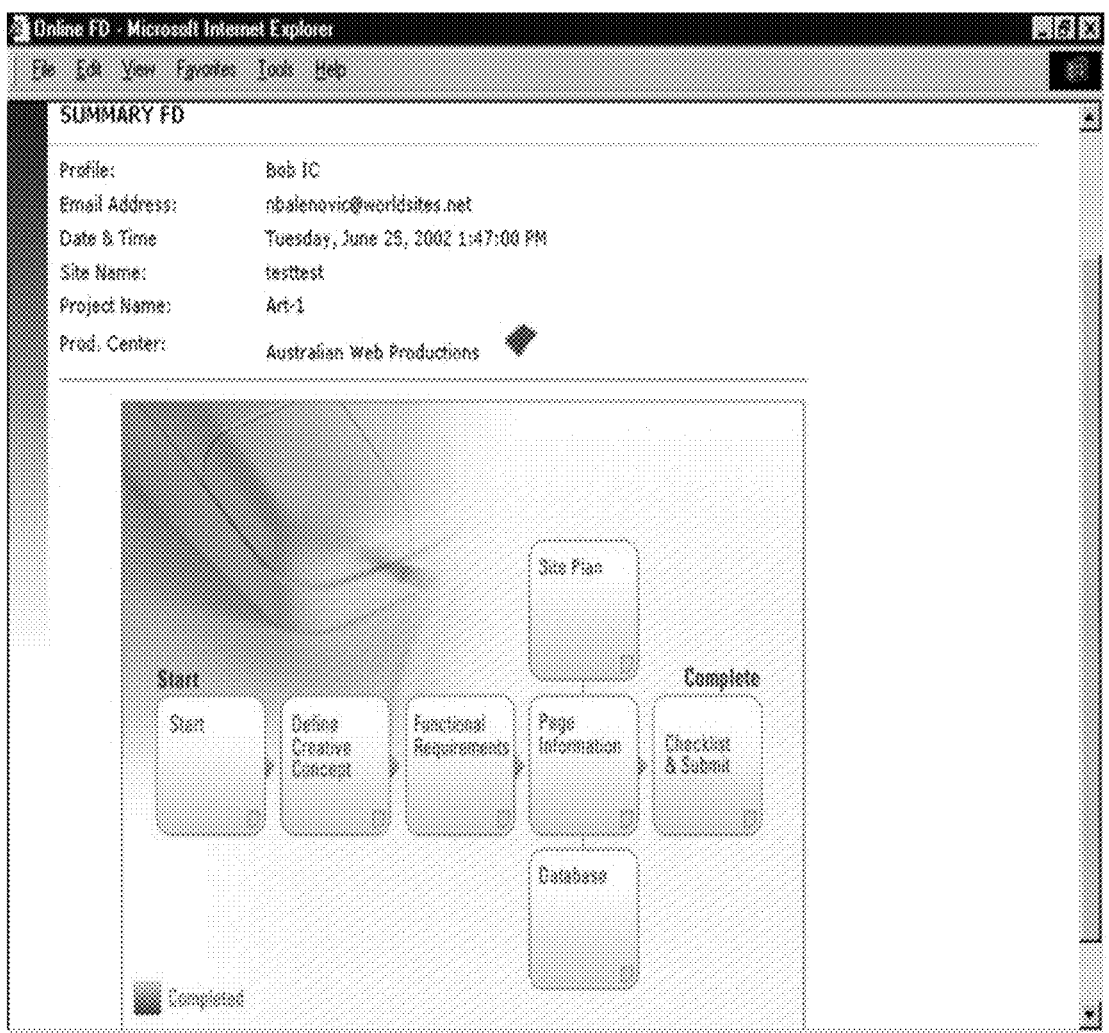
Figure 24:
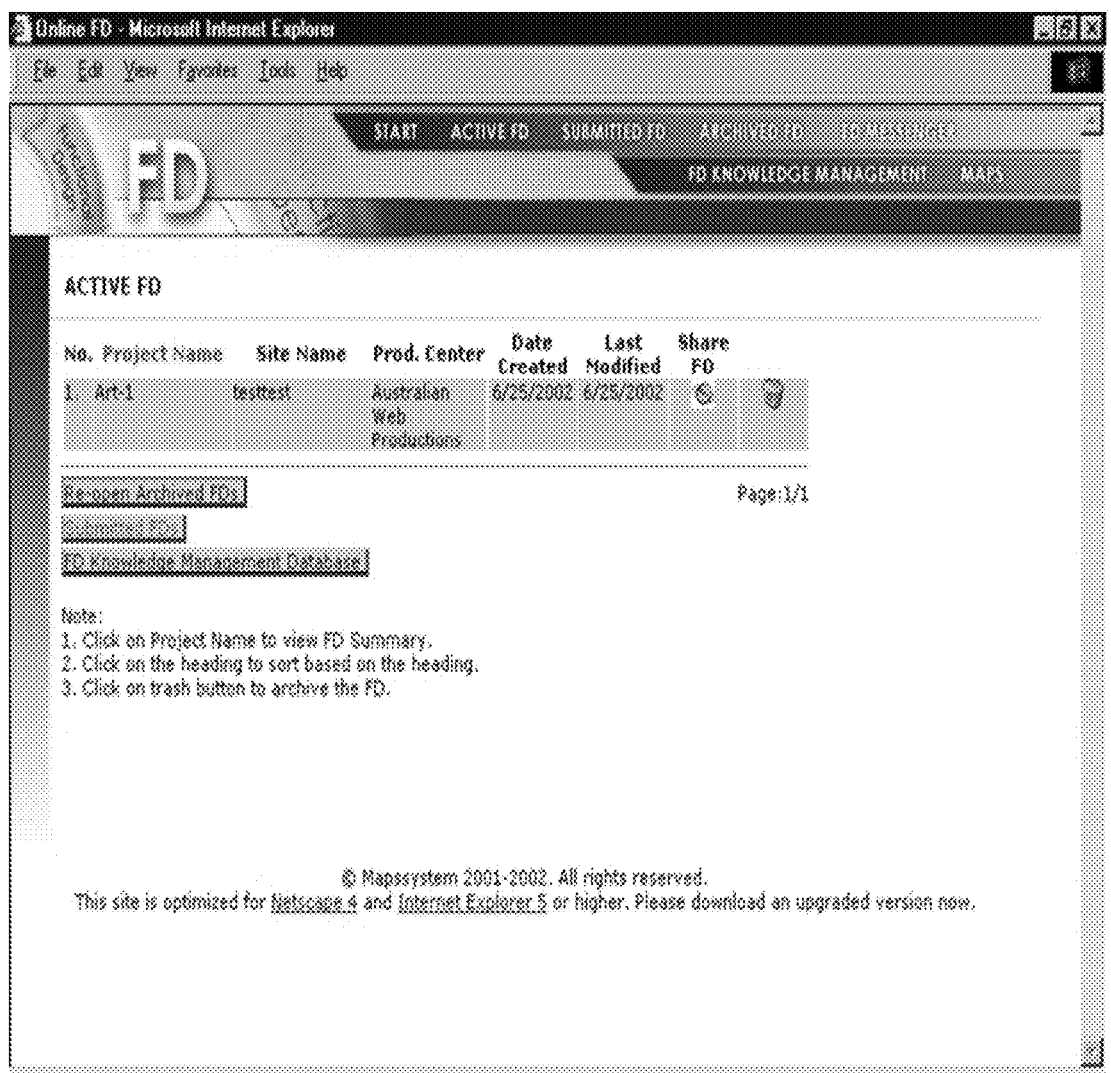
Figure 26:
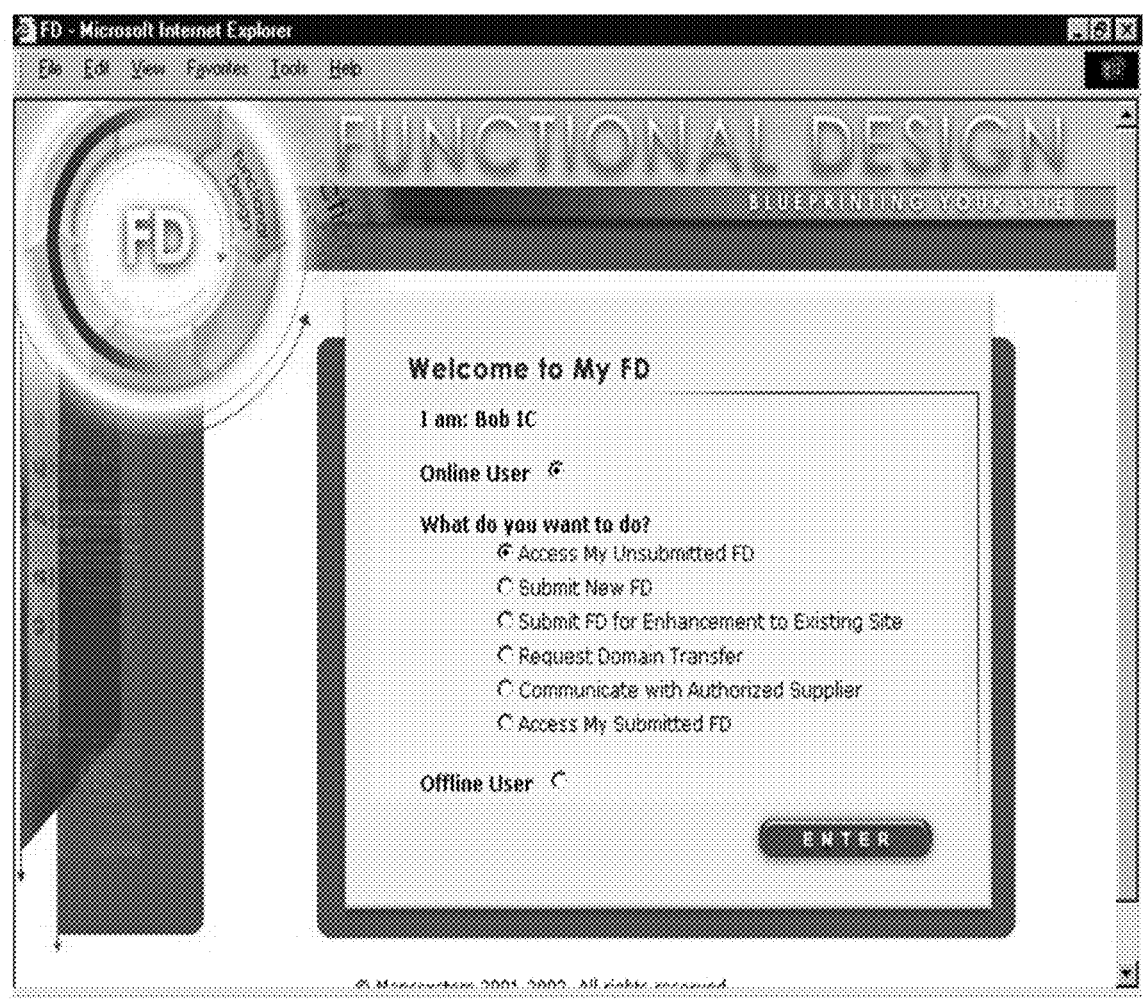
Figure 27:
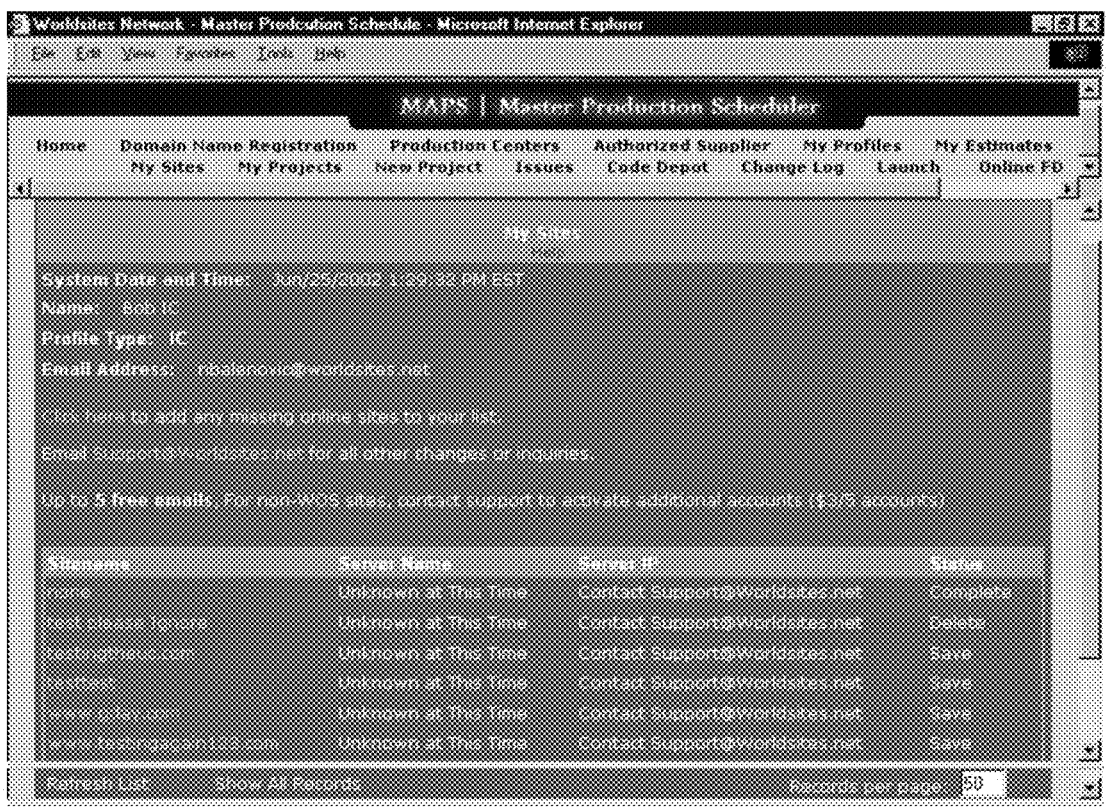
Figure 28:
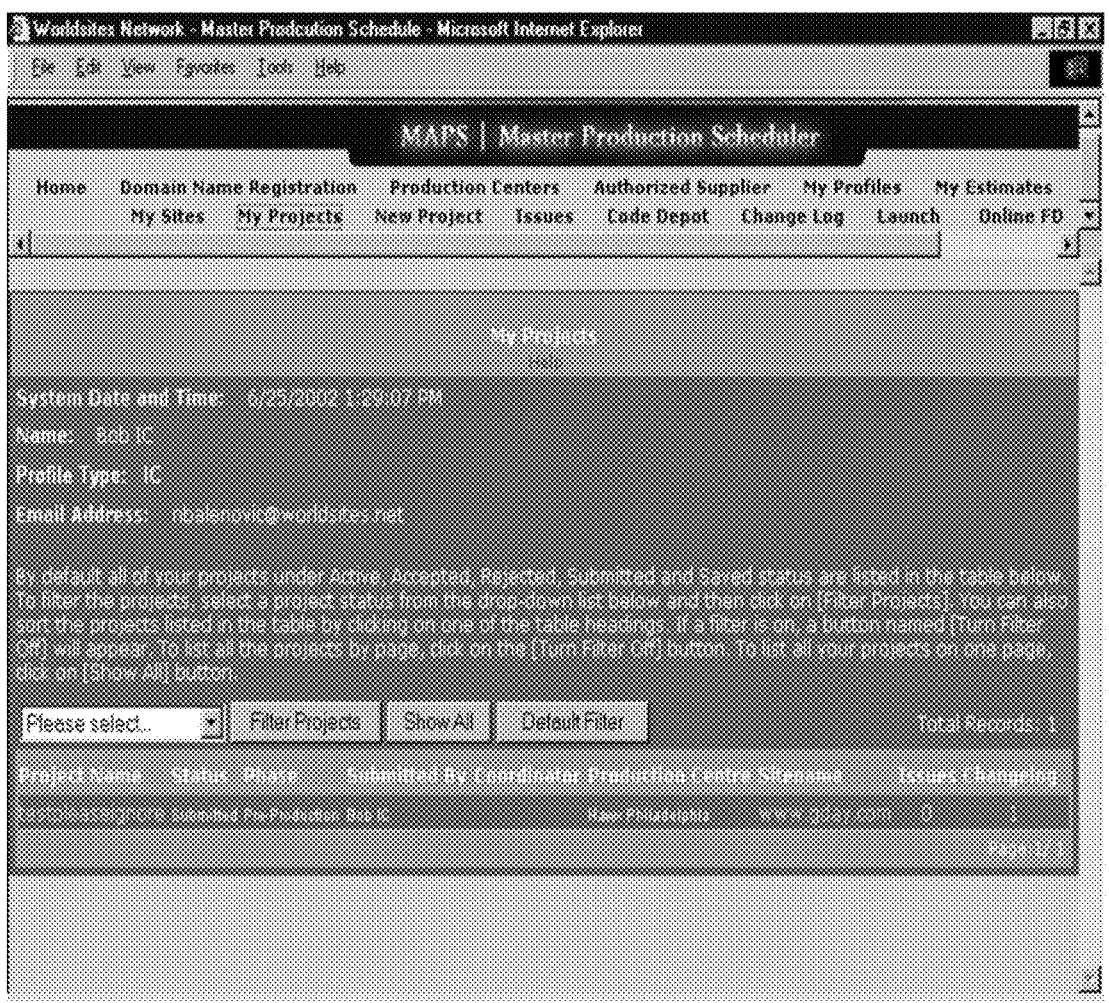
Figure 29:
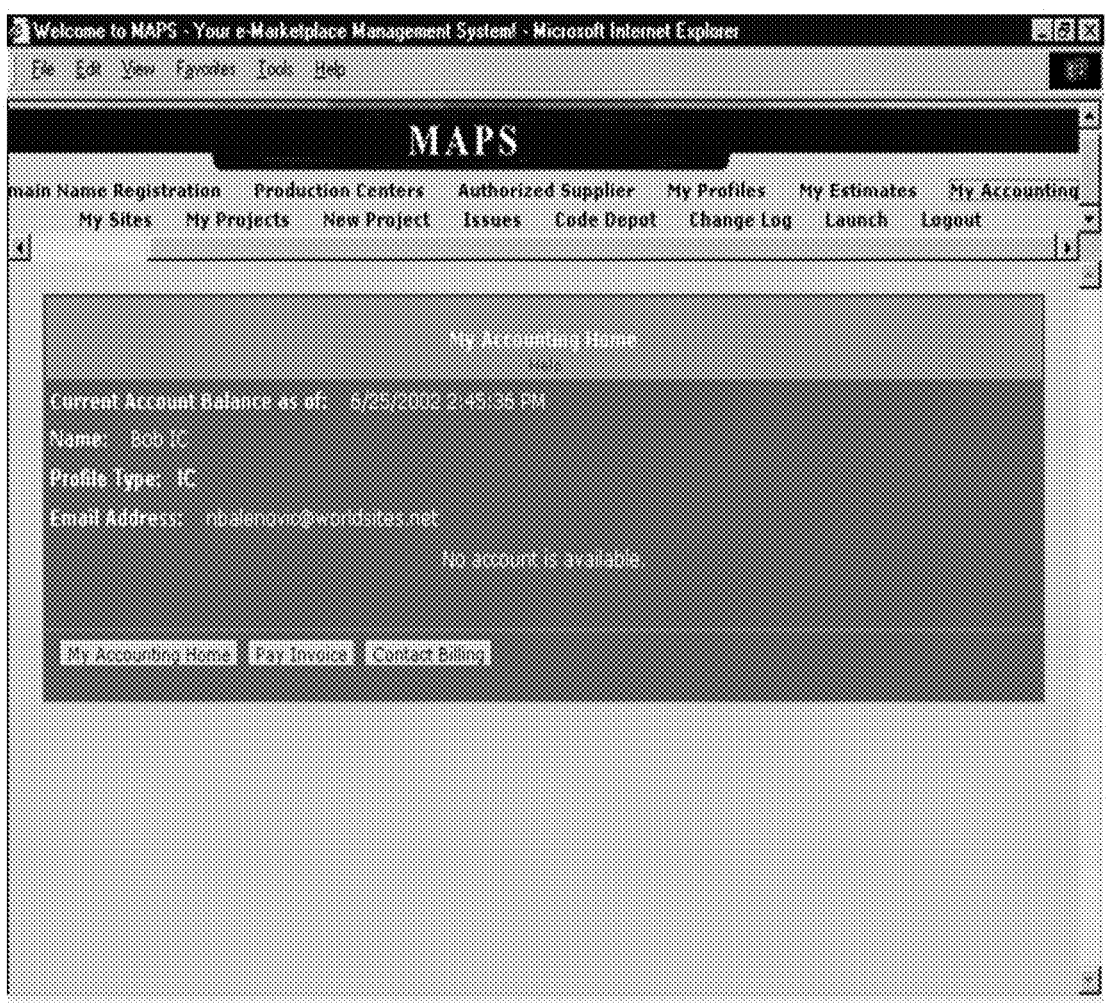
Figure 30:
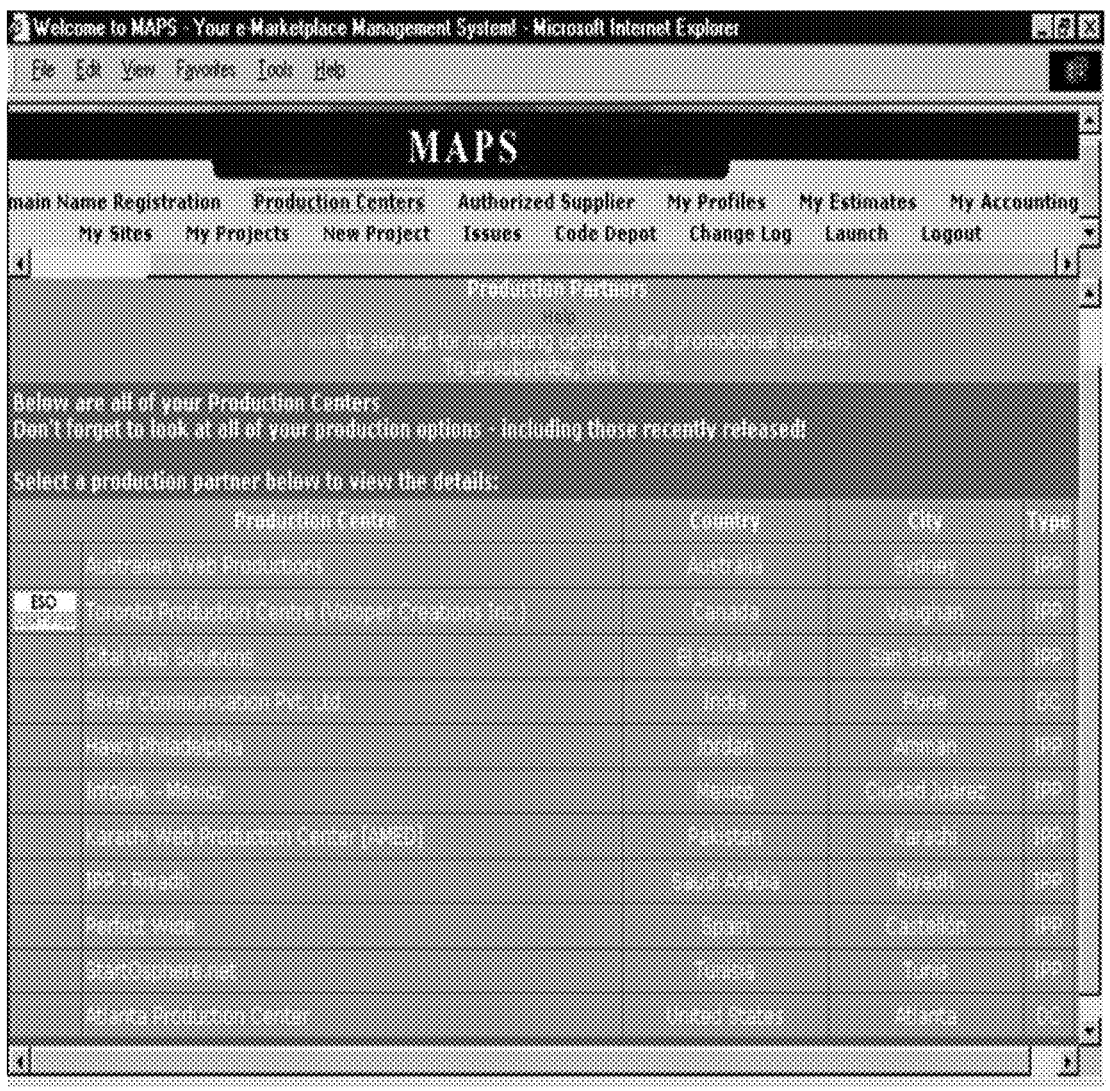
Figure 31:
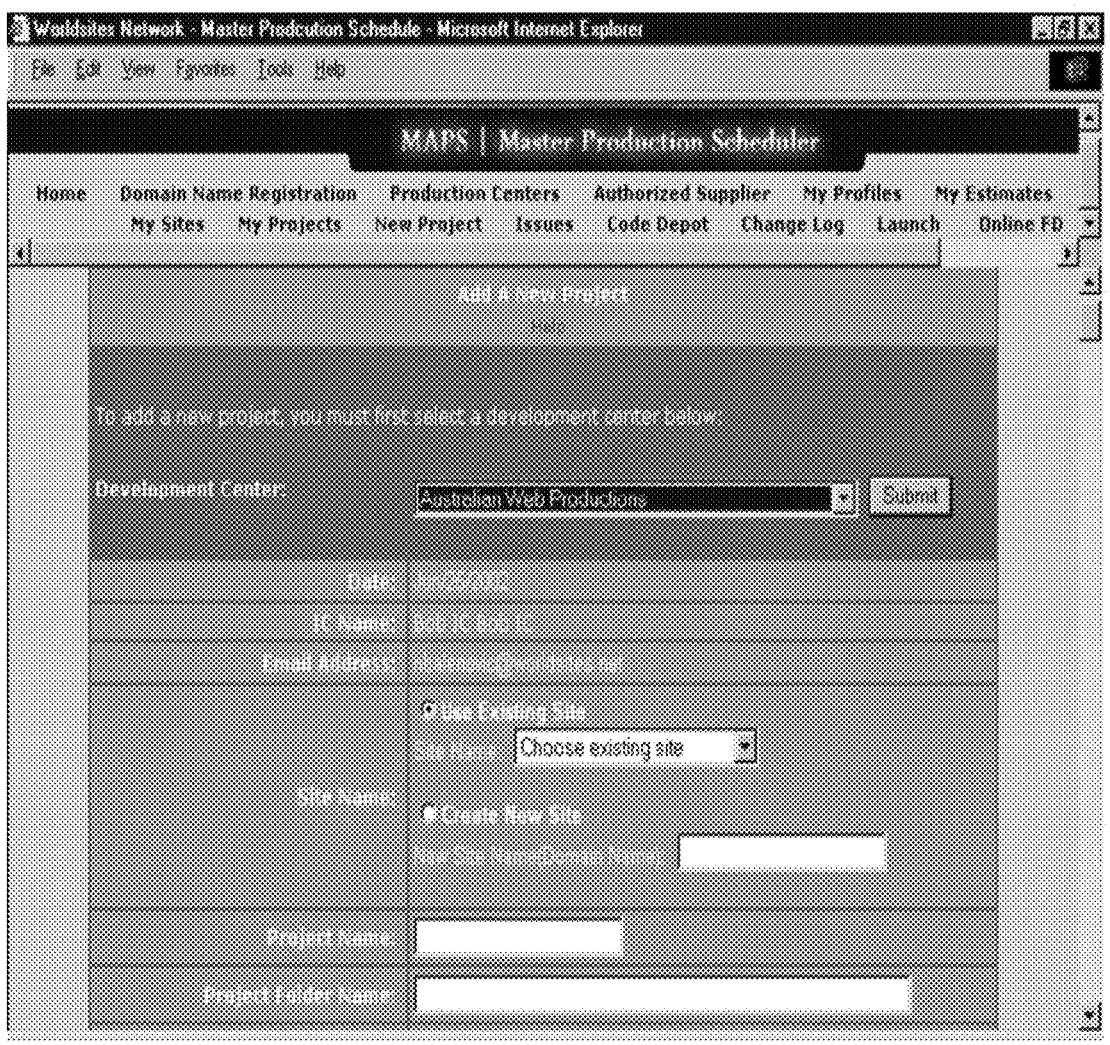
Figure 32:
Figure 33:
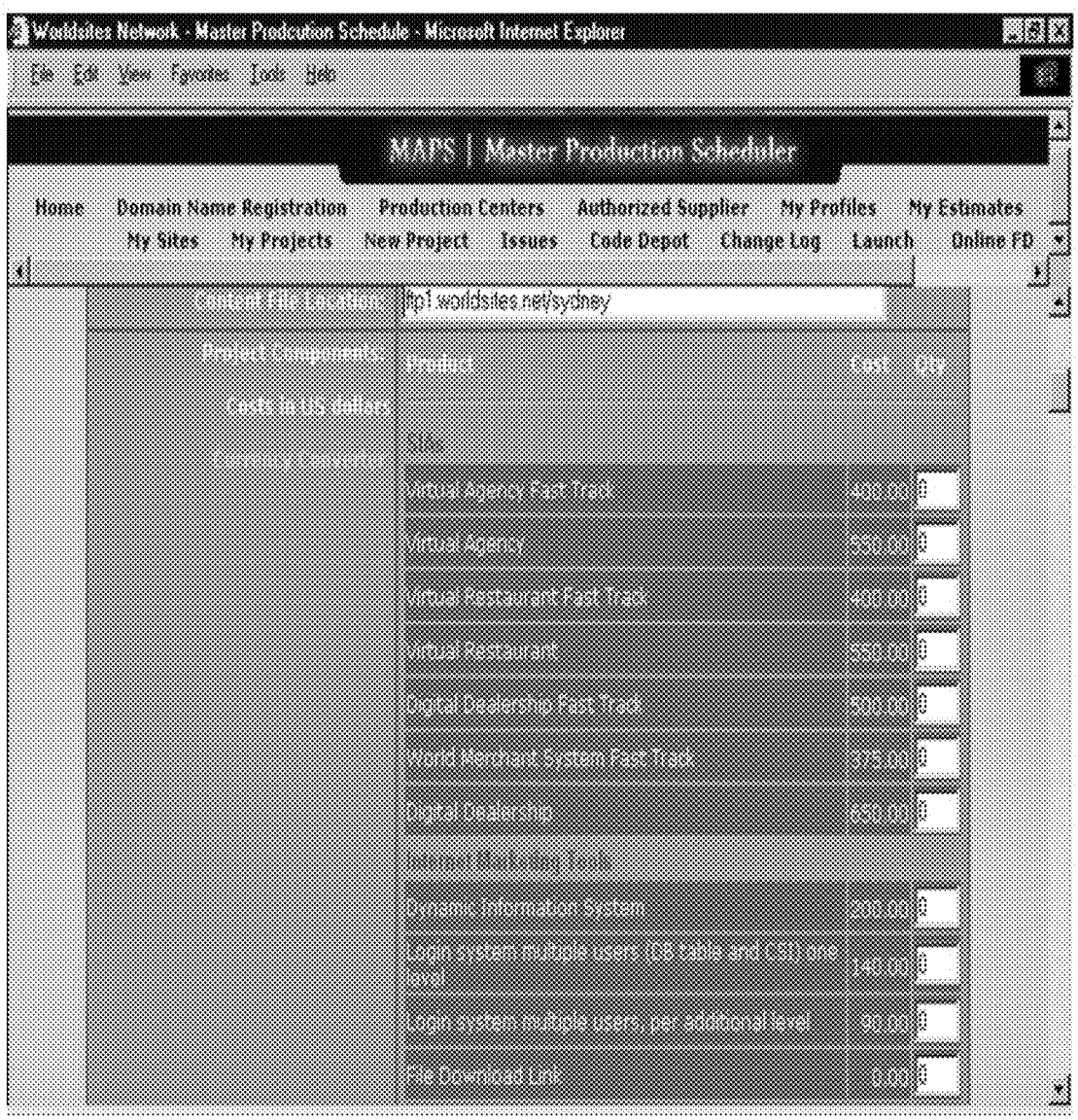
Figure 34:
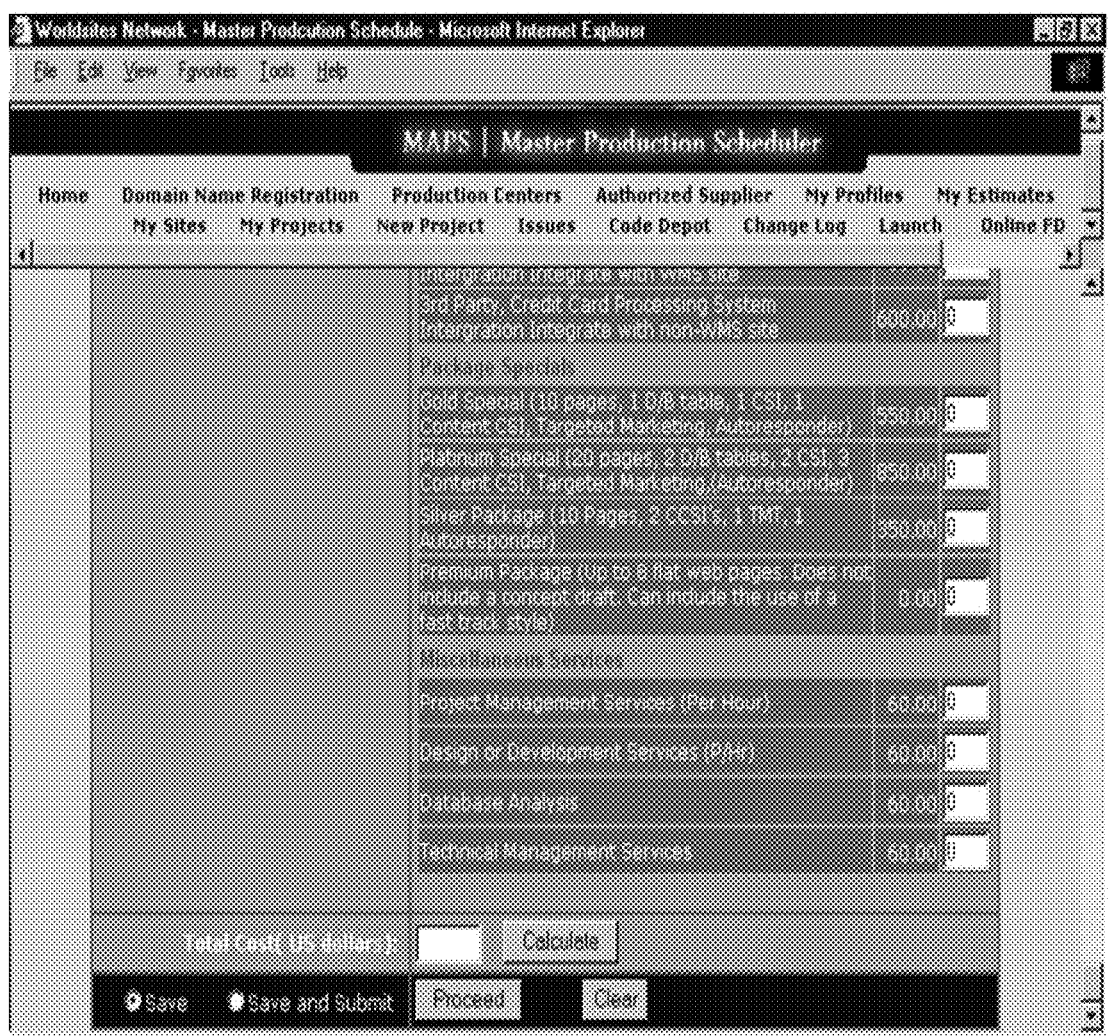
Figure 35:
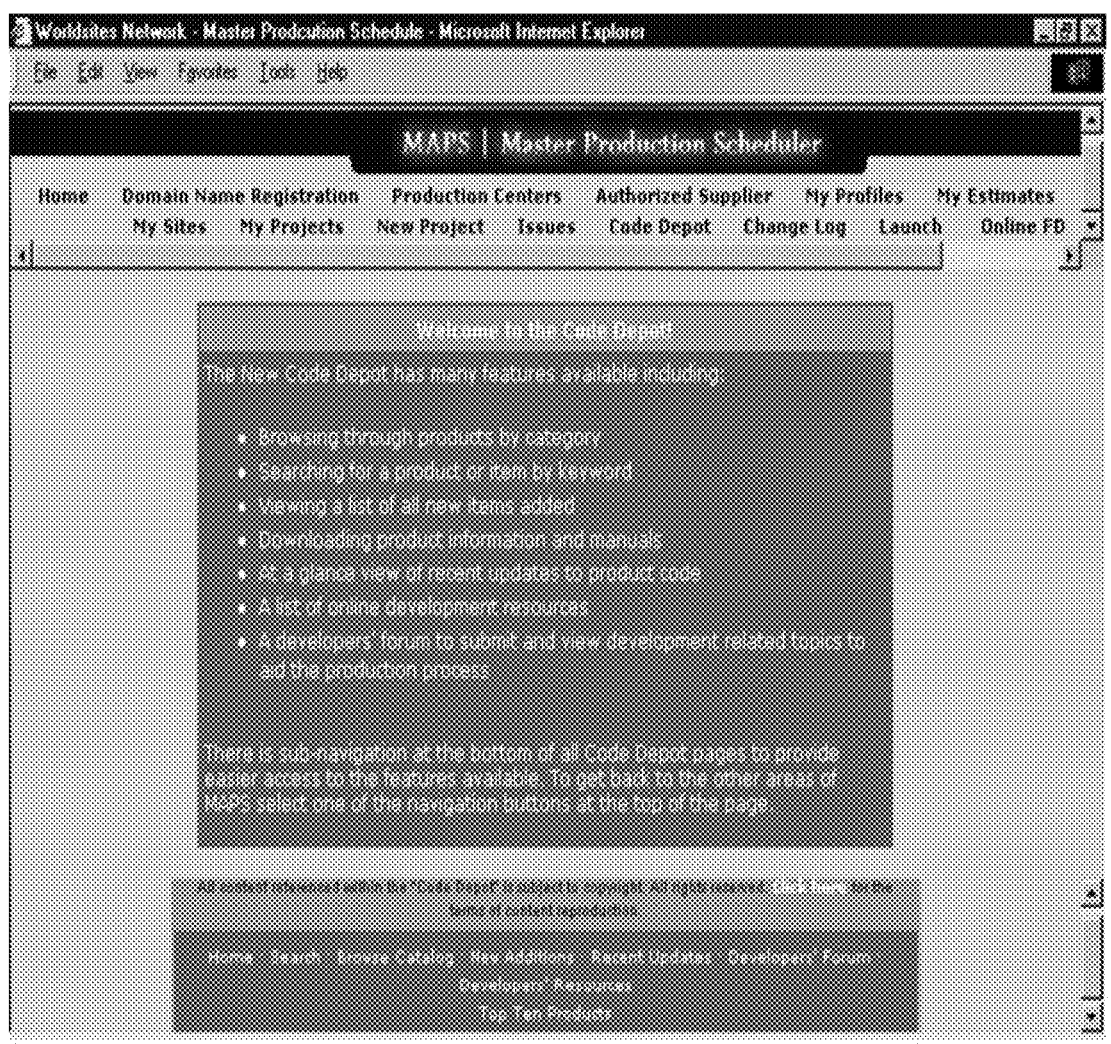
Figure 36:
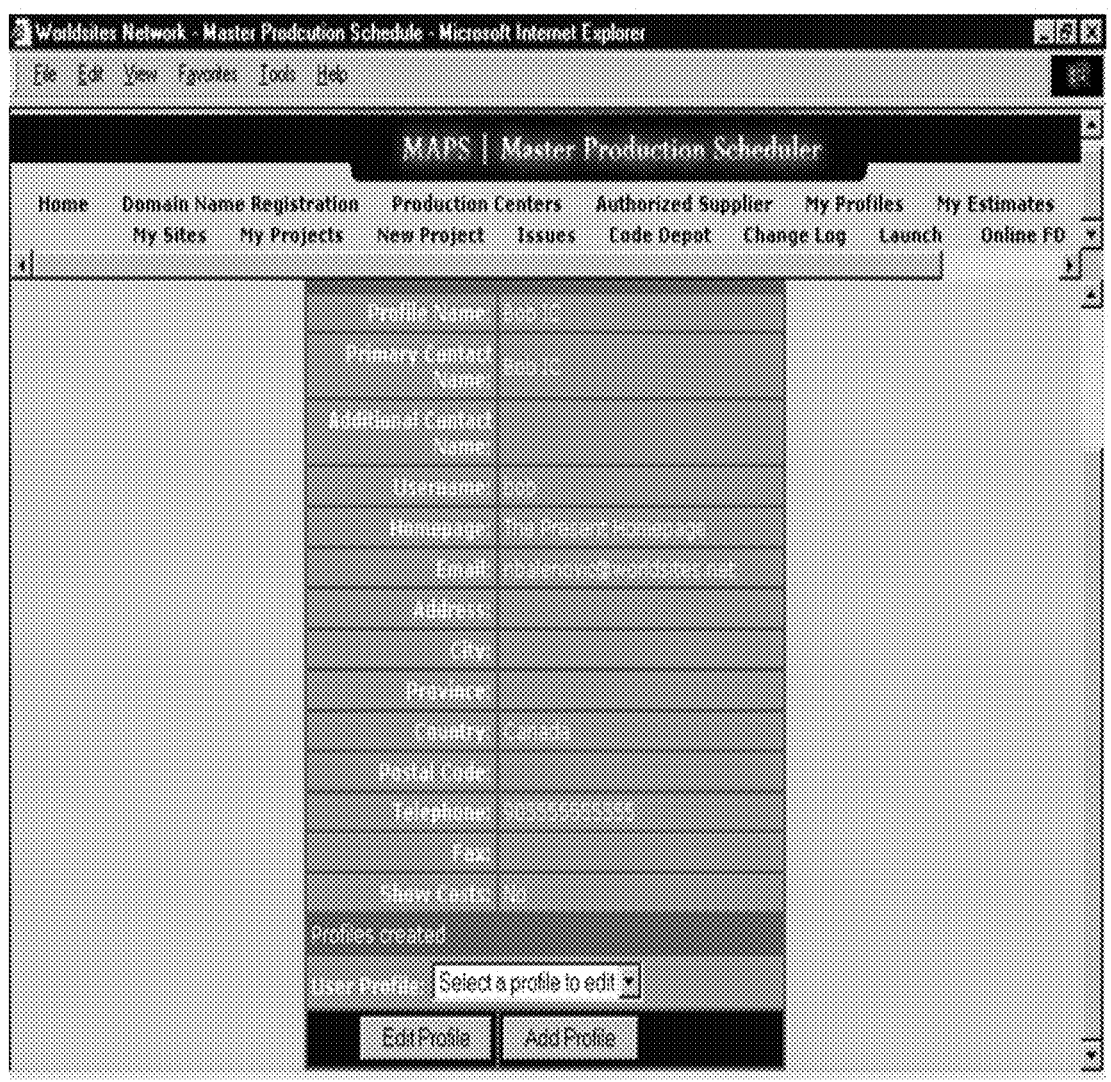
Figure 37:
Figure 38:
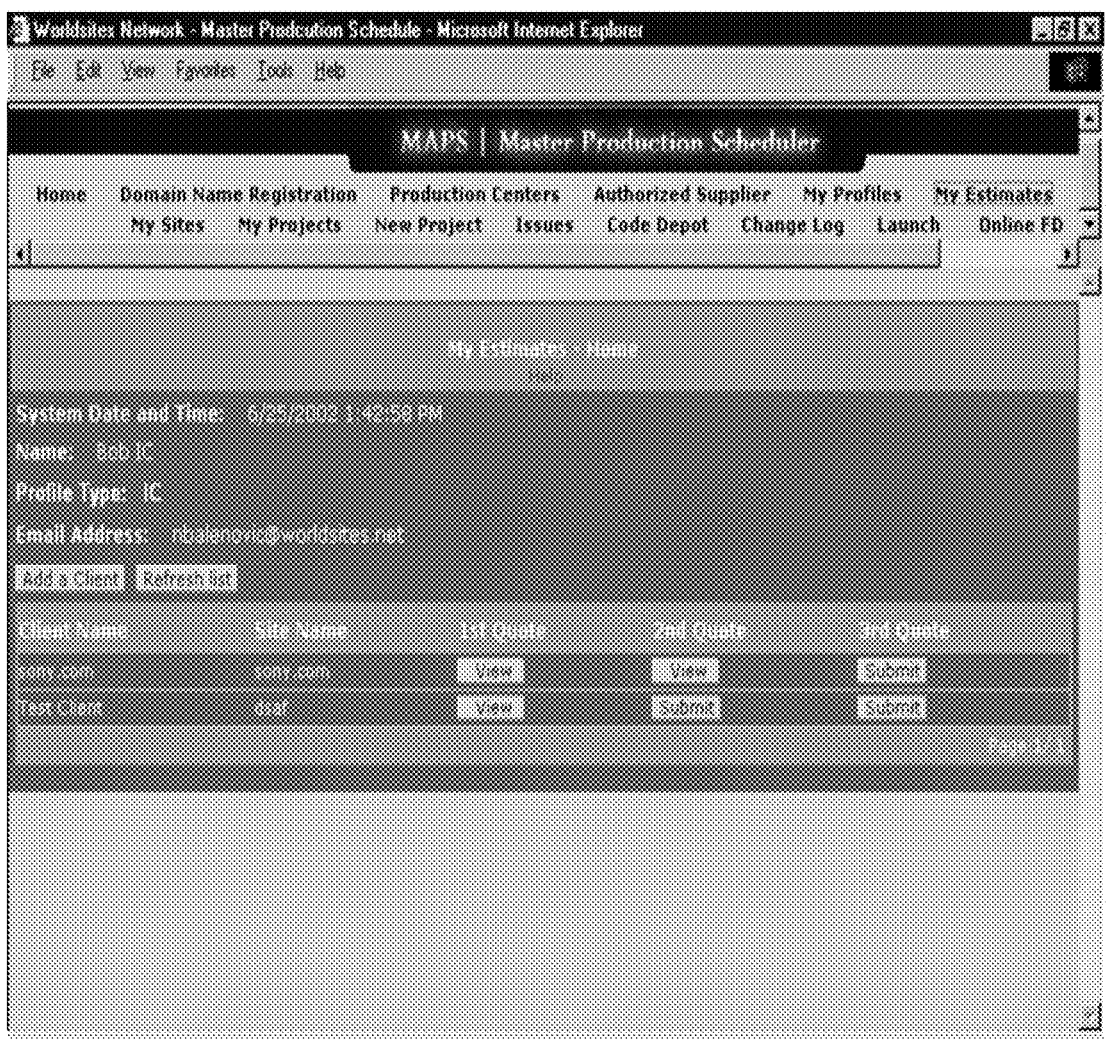
Figure 39:
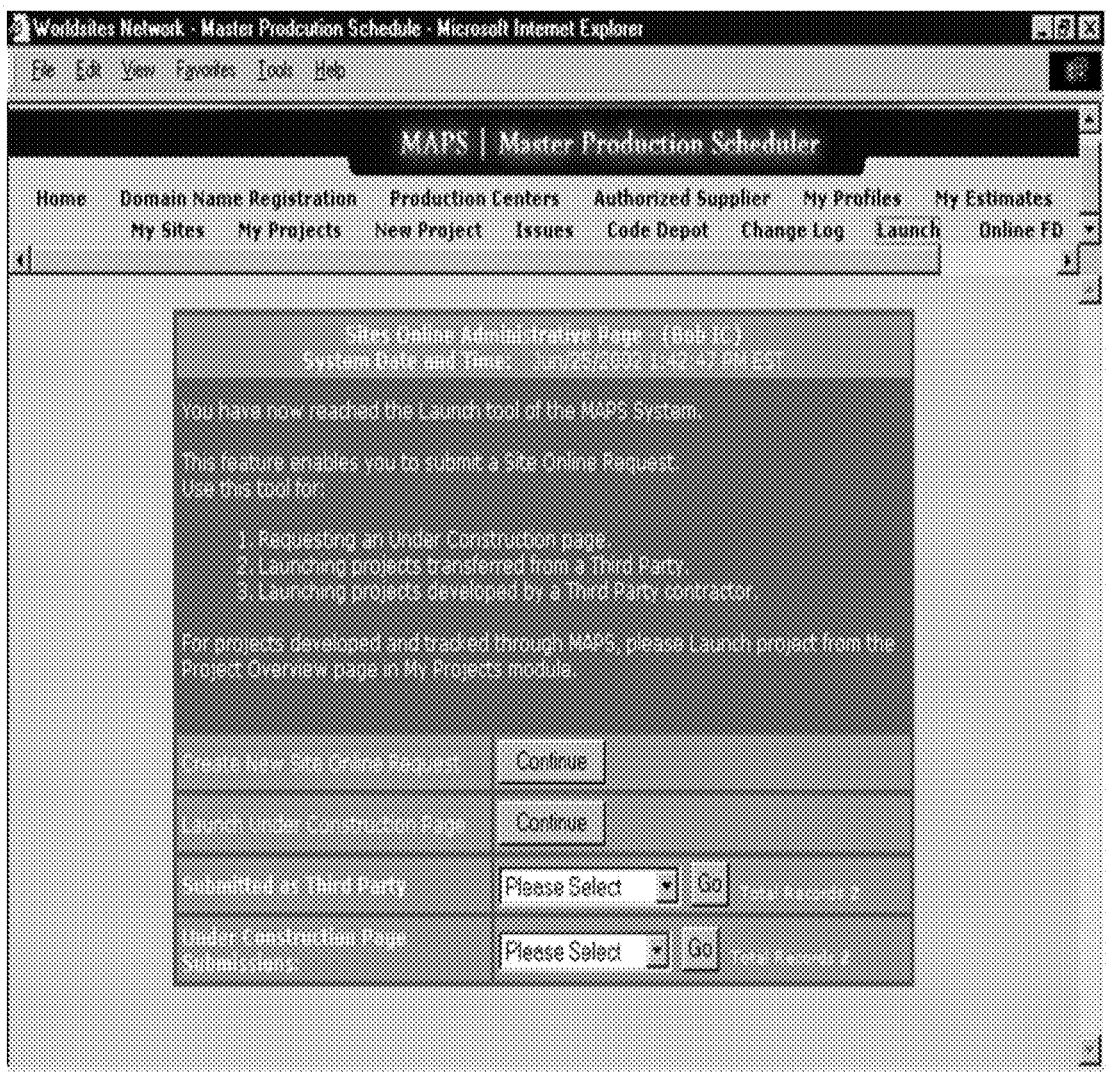
Figure 40:
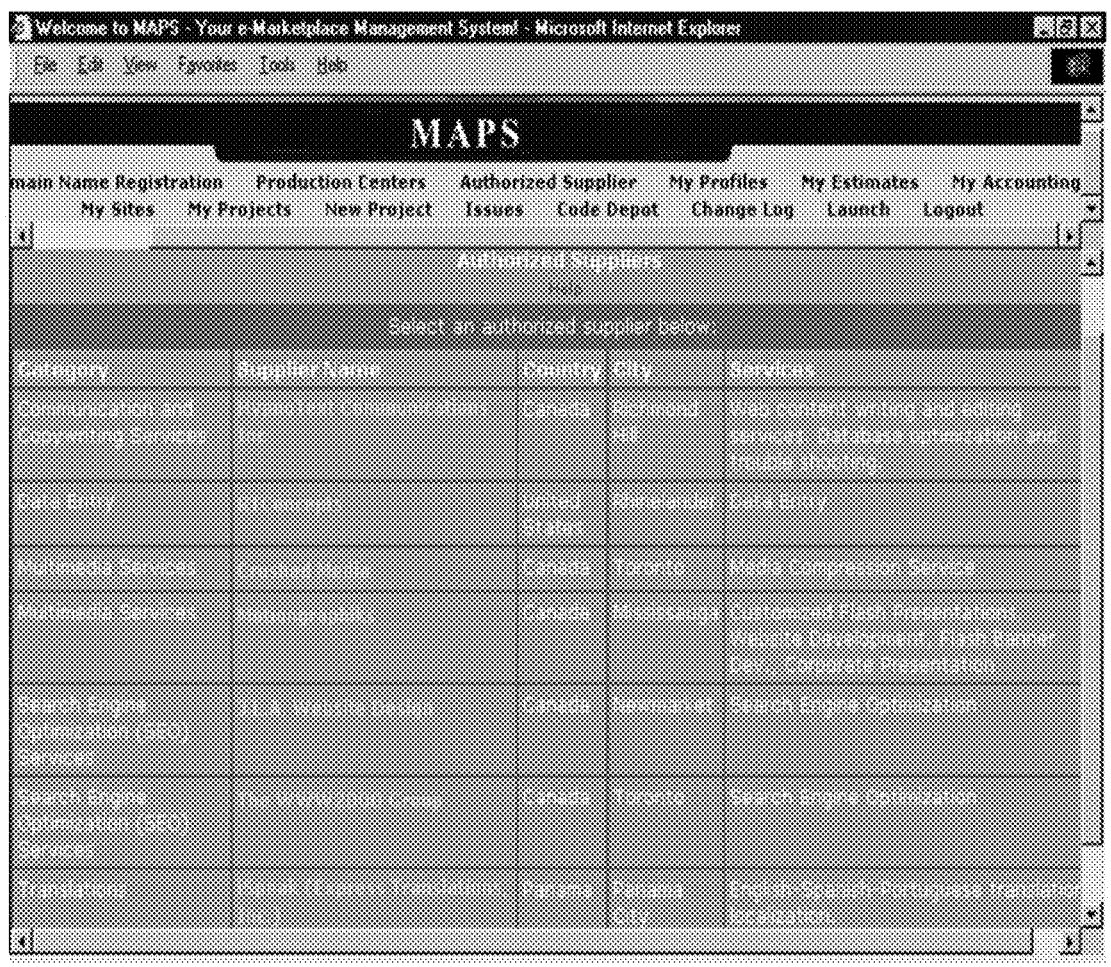

FIGS. 14-26 are screen shots illustrating the functional design phase, in an embodiment of the present invention. FIGS. 14-15 are screen shots illustrating the creative concept guidelines. FIGS. 16-17 are screen shots illustrating the functional requirement guidelines. FIG. 18 is an screen shot illustrating the website plan feature. FIGS. 19-20 are screen shots illustrating the page information feature. FIG. 21 is an screen shot illustrating the database feature. FIG. 22 is a screen shot illustrating the summary report feature. This screen shot can be accessed at any time to view the status of the creative concept, functional requirements, website plan, page information, and database features. FIGS. 23-26 are additional screen shots illustrating the functional design phase.

Building Phase

Figure 10:
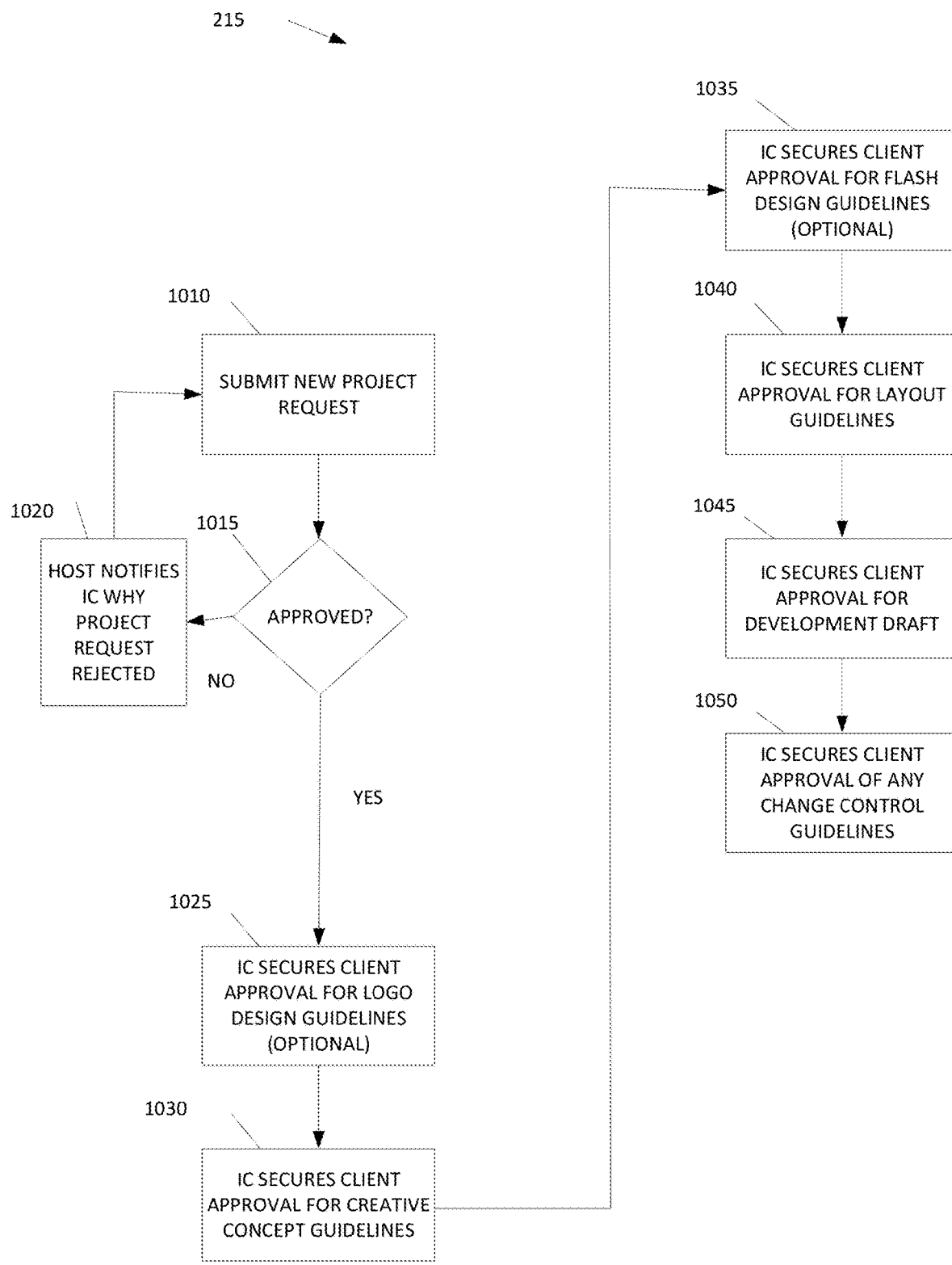
FIG. 10 is a flowchart illustrating building phase 215, according to an embodiment of the present invention.

FIG. 10 is a flowchart illustrating building phase 215, according to an embodiment of the present invention. The building phase assists the IC and the host in managing the production of the website to ensure effective solution delivery and client satisfaction. The building process emphasizes quality control project management and client involvement, and allows for ensuring acceptance of the functional design, tracking production issues for resolution, reviewing creative concept, layout and development drafts of the website, and managing changes to the scope of the website.

In step 1010, the IC submits a new project request to the host. In step 1015, the host reviews and either rejects or accepts the new project request. If the submission is rejected, in step 1020, the host notifies the IC as to why the project was rejected (e.g., the submission requires changes, the host cannot support the product request due to resource constraints).

If the submission is accepted, in optional step 1025, the IC secures client approval for the logo guidelines. The logo design is a flat (no animation) graphic design prototype of the client's new logo. The IC reviews the logo guidelines, documents any issues using an issue tracking tool (e.g., an online tool), presents the logo to the client, enters required changes in the issue resolution tracking section, and has the client sign the logo approval form once identified changes in the issue tracking tool have been made.

In step 1030, the IC secures client approval for the creative concept guidelines. The creative concept is the graphic design prototype, look and feel of the website. The IC compares the creative concept draft to the functional design requirements, documents any issues, presents the draft to the client, enters required changes in the issue resolution tracking section, and has the client sign the approval form once identified changes in the issue tracking tool have been made.

In optional step 1035, the IC secures client approval for flash design guidelines. The flash design is an animated sequence that may vary in complexity based on the number of animated actions in the sequence. The flash design may also consist of multiple, distinct sequences that are to appear in different sections of the website. The IC reviews the flash draft, documents any issues, presents the flash to the client, enters required changes in the issue resolution section, and has the client sign the flash approval form.

In step 1040, the IC secures client approval for the layout guidelines. The layout is the graphic design of an entire custom website. It is composed of all the pages of the website, unless certain pages are repetitive. The layout displays the color, layout, and navigation of the website. The layout is an opportunity to review all the visual elements of the website before coding. The layout guidelines do not apply to fastrack projects, but only custom projects. The IC reviews the layout draft, presents the layout draft to the client, enters required changes in the issue resolution section, and has the client sign the layout approval form.

In step 1045, the IC secures client approval for the development draft. The development draft is the working version of the website. It is composed of all the pages of the website, and includes active navigation links, animation, database driven pages, calculation, validation, and functionality. It also includes any administration functions for the content management of the website. The development draft provides a representation of the layout and the functions of the website. The development draft should be a representation of what the website will look like and how it will function when it is live. The development draft approval process involves detailed testing of the website. The IC reviews the development draft, documents any issues, presents the development draft to the client, enters required changes in the issue resolution section, and has the client sign the development draft approval form.

In step 1050, the IC secures client approval of any change control guidelines. The change control documents the new client requirements after the client has signed a contract and the website has already been submitted for production. In this case, the IC maps the changes on the website plan, creates page information sheets, defines database data elements, and transmits all change control documents to the host.

Screen Shots.

Figure 41:
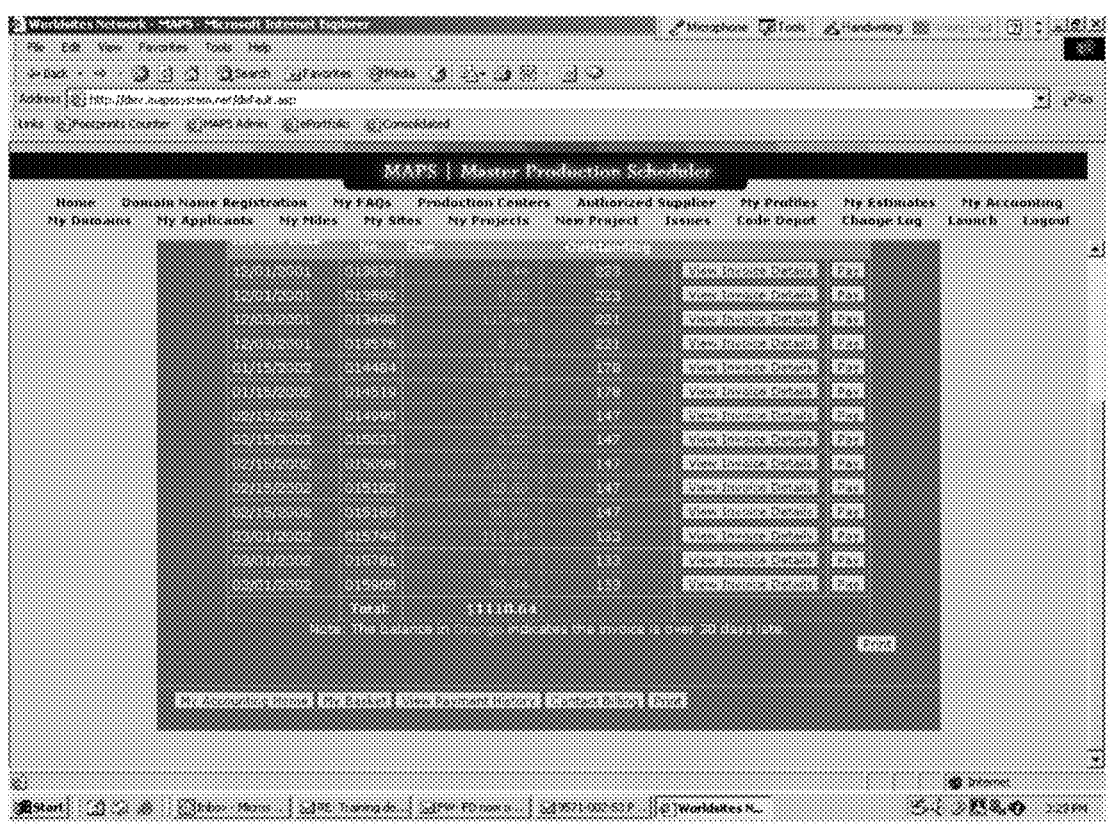
Figure 42:
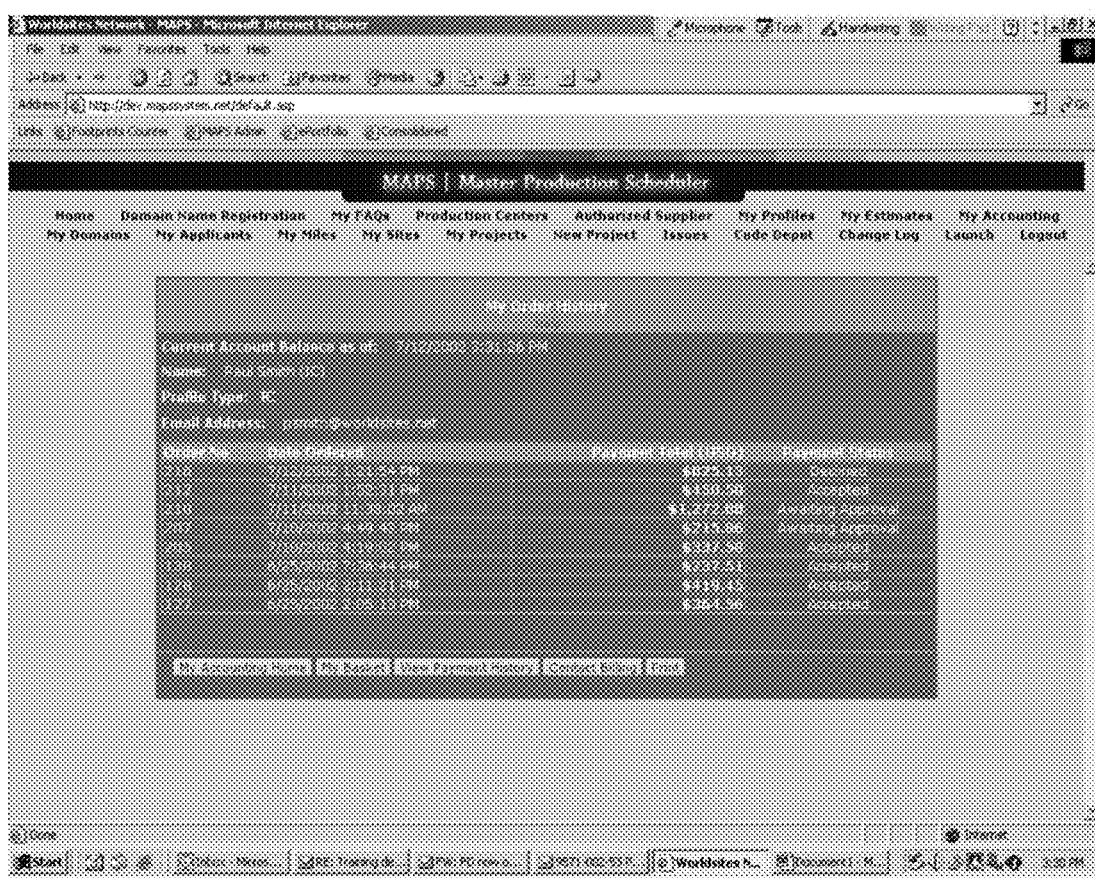
Figure 43:
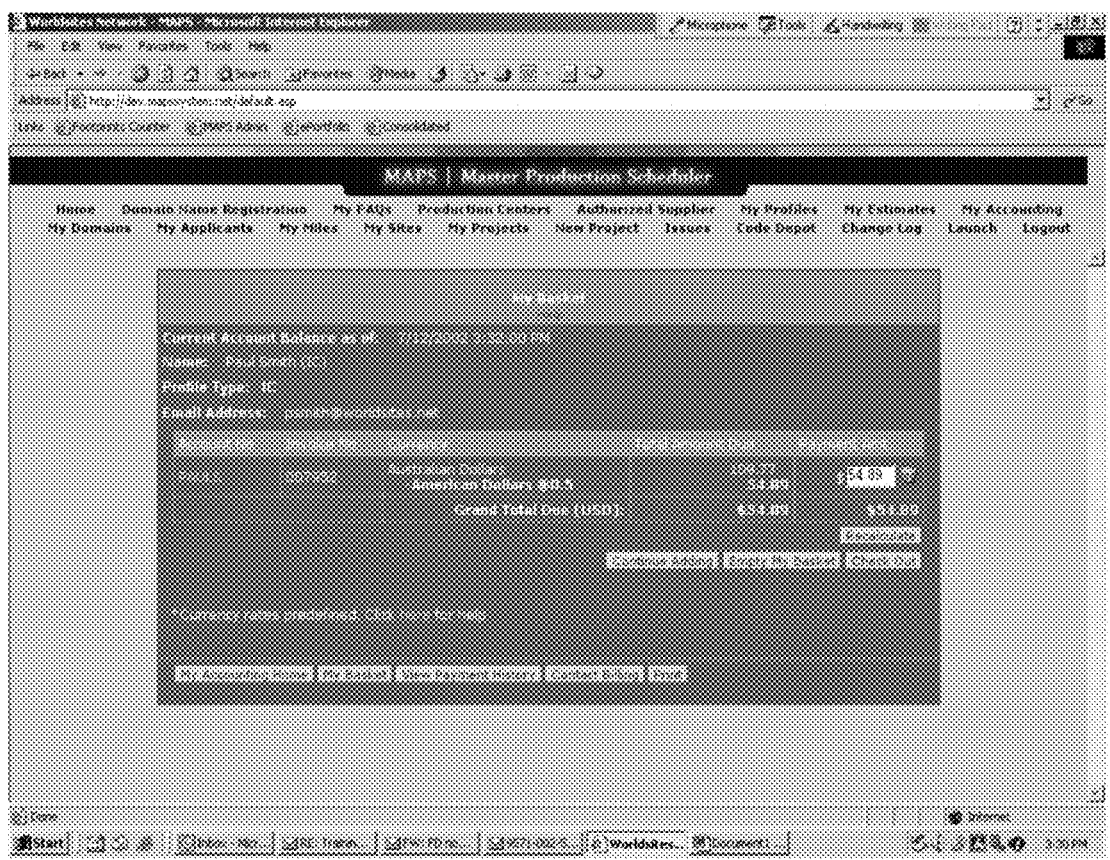

FIGS. 27-43 are screen shots illustrating the building phase, in an embodiment of the present invention. In alternative embodiments, the screen shots can be used in other phases of the invention. For example, FIGS. 41-43 are on-line accounting-related screen shots that can be used during the building phase, as well as other phases of the present invention.

Testing Phase

Figure 11:
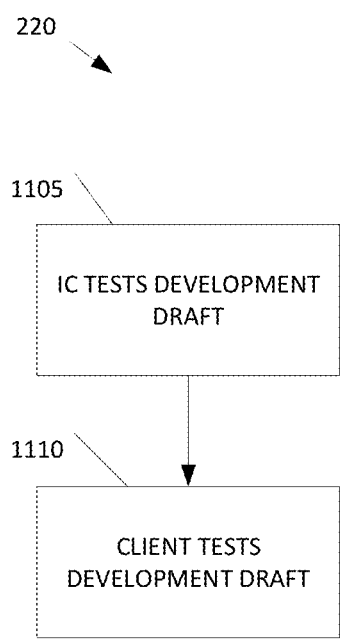
FIG. 11 is a flowchart illustrating testing phase 220, according to an embodiment of the present invention.

FIG. 11 is a flowchart illustrating testing phase 220, according to an embodiment of the present invention. The testing phase is designed to insure a quality solution, emphasizing quality control and client involvement. In step 1105, the IC tests the development draft of the website. The development draft is the working version of the website after coding and programming. Issues are noted in the issues tracking and reviewed by the host, with a subsequent development draft being created. Testing includes unit testing (verifies that all individual website functions perform), integration testing (verifies that functions or applications interface), compatibility testing (verifies website can be viewed and accessed by large majority of public), system testing (verifies client's hardware, software, and networking components support the website), security testing (verifies website is immune to unauthorized attempts to access it), error message testing (verifies website properly notifies the user of any errors), volume/stress testing (verifies weak points under varying workloads), destructive testing (verifies how the website responds to unusual or unexpected situations), and performance testing (verifies how the website measures against service-level requirements). In step 1110, the client tests the development draft to verify that all business functions from the client's point of view are operating correctly. Issues are noted in the issues tracking and reviewed by the host, with a subsequent development draft being created. Once the client is satisfied with the development draft, the client signs a final approval form.

In an alternate embodiment of the present invention, the host implements technical testing standards that have been tested extensively by ICs and clients for usability and other desired features.

Launching Phase

Figure 12:
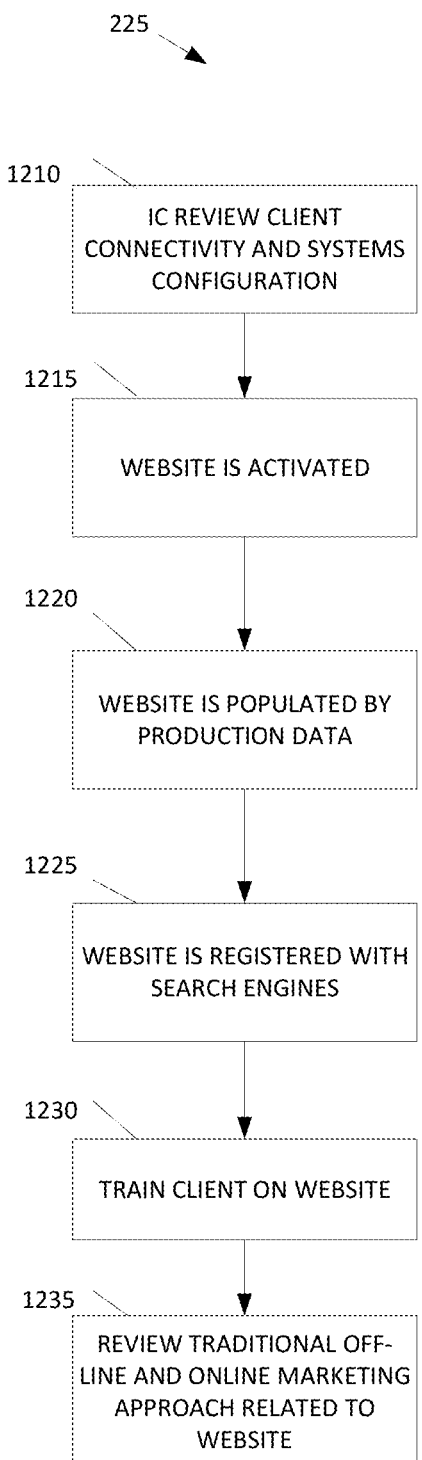
FIG. 12 is a flowchart illustrating launch phase 225, according to an embodiment of the present invention.

FIG. 12 is a flowchart illustrating launch phase 225, according to an embodiment of the present invention. During the launching phase, the website is placed live on the Internet and the IC and the client work closely to ensure the website's success as a true business solution.

In step 1210, the IC reviews the client's level of connectivity and the systems configuration. If needed, a recommendation for an Internet service provider (ISP) and a systems consultant is provided.

In step 1215, the website is activated, which is the process of making the website available for public view on the Internet. The process involves many steps and includes the movement of files between servers and directories. The IC ensures that the domain name resides on the host's server, completes all sections of the website online request form, and reviews website functions.

In step 1220, the website is populated by the production data. Many websites include databases and content client side interfaces that store data. In most cases, these were built using a sub-set of the data that will be available on the website when it is online. In these cases, the remaining data is populated after the website is launched. In this process, the appropriate text and images, database tables are populated. In addition all test functions associated with each page are completed.

In step 1225, the web site is registered with search engines. One of the key ways to drive targeted traffic is to ensure that the website is ranked high within search engine listings. The client should be consulted to discuss search engine strategies. The impact and optimization of the search engines are discussed, and existing traffic reports are reviewed. Then the website should be registered with the major search engines, and community and industry-specific search engines and hub-websites. The registration efforts are documented for the client's records.

In step 1230, client training is conducted so that the client becomes familiar with the website's inner-workings and is further invested in the website's success. In addition, topics of interest to the client are discussed.

In step 1235, marketing activities are performed. These include conducting a marketing business analysis, reviewing a client's collateral material, and considering: online and offline marketing options (e.g., email marketing, traditional direct mail, traditional print, radio and television advertising), a web warming party, press releases about the website, banner advertising and a referral program.

Managing Results Phase

Figure 13:
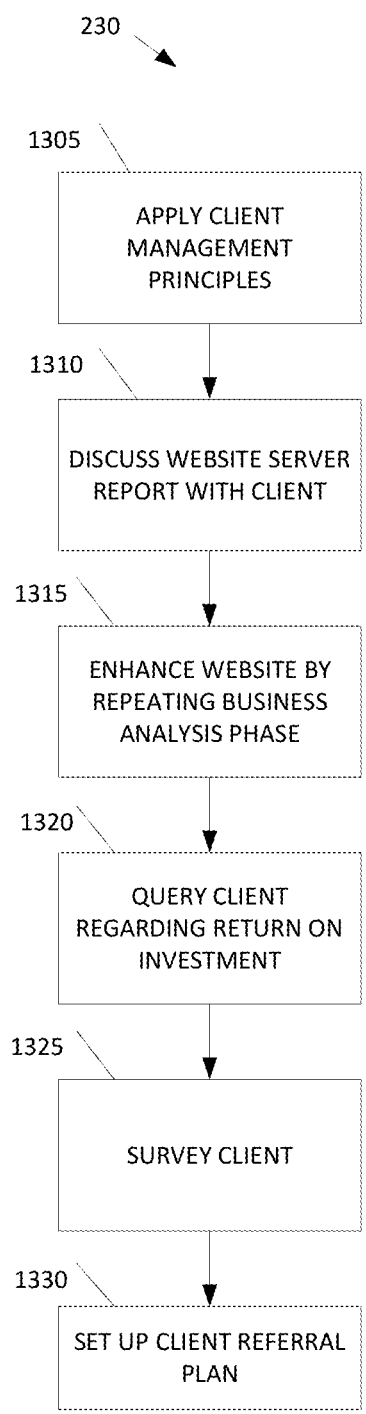
FIG. 13 is a flowchart illustrating managing results phase 230, according to an embodiment of the present invention.

FIG. 13 is a flowchart illustrating managing results phase 230, according to an embodiment of the present invention. The managing results phase is designed to provide after-launch client management and services that ensure client satisfaction while driving more business for the IC and host. In step 1305, principles of client management are applied. These principles are applied throughout the process 200, but are particularly important during the manage results phase when the client is most sensitive to the value of what they have purchased. These principles include educating the client, setting and meeting expectations, and staying in regular contact with the client.

In step 1310, the IC and the client discuss the website's server report. The client is given the option of a standard (no access to website traffic analysis) or premium web-hosting option (includes access to website traffic analysis). If the client selects the premium option, a service such as that provided by Urchin Software Corp. can be used to track data on the website.

In step 1315, the website is enhanced, if needed. Internet technologies and the global market are in constant change, and thus the client is given the option of upgrading. If an upgrade is desired, a subsequent business analysis is run, and the process 200 begins again.

In step 1320, the client is queried about the return on investment. Based upon previously agree upon criteria, the IC polls the client about the website's performance and the client's satisfaction.

In step 1325, the client is surveyed. Assessment and feedback are essential elements for continuous improvement. Documenting client feedback allows the host and IC to evaluate the business. The survey asks for feedback, including, but not limited to, feedback about the IC, the client's experience, the process, and the client's satisfaction with their Internet solution.

In step 1330, a referral program is set up. The IC and client agree on a referral program. The IC agrees to provide compensation (e.g., pay a preset sum, provide client credit) for every referral that results in a signed contract. This gives the client added incentive to work with the host and IC in the future.

CONCLUSION

The present invention is described in terms of the above embodiments. This is for convenience only and is not intended to limit the application of the present invention. In fact, after reading the description of the present invention, it will be apparent to one skilled in the relevant art(s) how to implement the present invention in alternative embodiments.

In addition, it should be understood that FIGS. 1-13 described above, which highlight the functionality and advantages of the present invention, are presented for example purposes only. The architecture of the present invention is sufficiently flexible and configurable, such that it may be utilized in ways other than that shown in FIGS. 1-13.

Furthermore, it should be understood that the screens shown herein, which highlight the functionality of the present invention, are presented for example purposes only. The software architecture (and thus, the screens) of the present invention are sufficiently flexible and configurable such that users may navigate through the system and method in a manner other than those shown in the screen shots.

What is claimed is:

1. A computer-implemented method for facilitating development of two or more customized website projects over a network, comprising:

for each customized website project, receiving electronic data in functional design modules which can be utilized by a website developer to create the customized website, the functional design modules comprising:

a creative concept module requesting information related to: a business description, a marketing activity, a selling proposition, an internet marketing activity, a reference, a comment, and a logo;

a research and analysis module requesting information related to: client research comprising key decision makers, company size, news events affecting the company, and key clients; market research comprising target market, key industry terminology and trends, key competitors, and industry challenges; Internet research comprising host-developed websites in the same industry, current client website and its effectiveness, news events regarding how the Internet is affecting the client's industry; and documentation of the research;

a website plan module requesting information related to a site plan;

a flash design module requesting information related to multiple, distinct sequences to appear in different sections of the customized website; and a launching module placing the customized website live on a server and registering the customized website with search engines to optimize traffic levels; and automating access to the electronic data in the functional design modules by a computer over the network;

automating obtaining at least one of the at least two customized website projects from the website developer, the website developer using the functional design report to create the at least one of the at least two customized website projects; and launching the customized website for the at least one of the at least two customized website projects, wherein the launching comprises: reviewing connectivity of client systems, and registering the customized website with search engines.

2. The method of claim 1, wherein the functional design modules comprise: an Internet business analysis module requesting information related to Internet formatting, Internet business practices, and desired Internet features.

3. The method of claim 1 wherein the functional design modules comprise: a functional requirements module requesting information related to a required technical product and a needed quantity.

4. The method of claim 1, wherein the functional design modules comprise: a page information module requesting meta tag information.

5. The method of claim 1, wherein the functional design modules comprise: a database information module requesting information related to a database to use as a guideline.

6. The method of claim 1, wherein the customized website is ranked high within search engine listings, the search engines comprise: major search engines, community and/or industry-specific search engines, or hub-websites, or any combination thereof.

7. The method of claim 1, comprising: filtering the at least two customized website projects by at least one of: active status, accepted status, rejected status, submitted status, or saved status, or any combination thereof.

8. The method of claim 1, comprising: populating the customized website with production data.

9. The method of claim 1, further comprising utilizing information in the functional design modules to create a proposal comprising information related to: a client's Internet familiarity; a client's at least one business practice; and a client's at least one desired Internet application.

10. The method of claim 1, further comprising incorporating the proposal into a functional design report comprising: securing a domain name for the customized website; securing client approval for website look and feel guidelines; securing client approval for website functional requirement guidelines; creating a website plan based on the website look and feel guidelines and the website functional requirement guidelines; creating at least one page information sheet based on the website plan; or defining website database guidelines; or any combination thereof.

11. The method of claim 10, wherein securing client approval for the website look and feel guidelines comprises: obtaining client examples related to the website's desired look and feel; selecting a project path comprising a custom design allowing design of a custom look and feel and/or a fast-track style allowing selection of a look and feel from predetermined styles; or entering the client examples and the selected project path into the functional design report; or any combination thereof.

12. The method of claim 10, wherein securing client approval for the website functional requirement guidelines comprises: securing desired functional requirements from the client; and/or entering the desired functional requirements into the functional design report.

13. The method of claim 10, wherein creating a website plan comprises: identifying functions of the customized website; dividing functions into function components; sequencing the function components and the functions; or prioritizing the function components and the functions; or any combination thereof.

14. A computer-implemented system for facilitating development of two or more customized website projects over a network, comprising:
a processor configured for:
  receiving electronic data in functional design modules which can be utilized by a website developer to create the customized website, the functional design modules comprising:
    a creative concept module requesting information related to: a business description, a marketing activity, a selling proposition, an internet marketing activity, a reference, a comment, and a logo;
    a research and analysis module requesting information related to: client research comprising key decision makers, company size, news events affecting the company, and key clients; market research comprising target market, key industry terminology and trends, key competitors, and industry challenges; Internet research comprising host-developed websites in the same industry, current client website and its effectiveness, news events regarding how the Internet is affecting the client's industry; and documentation of the research;
    a website plan module requesting information related to a site plan;
    a flash design module requesting information related to multiple, distinct sequences to appear in different sections of the customized website; and
    a launching module placing the customized website live on a server and registering the customized website with search engines to optimize traffic levels; and
  automating access to the electronic data in the functional design modules by a computer over the network;
  automating obtaining at least one of the at least two customized website projects from the website developer, the website developer using the functional design report to create the at least one of the at least two customized website projects; and
  launching the customized website for the at least one of the at least two customized website projects, wherein the launching comprises: reviewing connectivity of client systems, and registering the customized web site with search engines.

15. The system of claim 14, wherein the functional design modules comprise: an Internet business analysis module requesting information related to Internet formatting, Internet business practices, and desired Internet features.

16. The system of claim 14, wherein the functional design modules comprise: a functional requirements module requesting information related to a required technical product and a needed quantity.

17. The system of claim 14, wherein the functional design modules comprise: a page information module requesting meta tag information.

18. The system of claim 14, wherein the functional design modules comprise: a database information module requesting information related to a database to use as a guideline.

19. The system of claim 14, wherein the customized website is ranked high within search engine listings, the search engines comprise: major search engines, community and/or industry-specific search engines, or hub-websites, or any combination thereof.

20. The system of claim 14, wherein the processor comprises:
filtering the at least two customized website projects by at least one of: active status, accepted status, rejected status, submitted status, or saved status, or any combination thereof.

21. The system of claim 14, wherein the processor comprises:
populating the customized website with production data.

22. The system of claim 14, wherein the processor comprises:
utilizing information in the functional design modules to create a proposal comprising information related to: a client's Internet familiarity; a client's at least one business practice; and a client's at least one desired Internet application.

23. The system of claim 14, wherein the processor comprises incorporating the proposal into a functional design report comprising: securing a domain name for the customized website; securing client approval for website look and feel guidelines; securing client approval for website functional requirement guidelines; creating a website plan based on the website look and feel guidelines and the website functional requirement guidelines; creating at least one page information sheet based on the website plan; or defining website database guidelines; or any combination thereof.

24. The system of claim 23, wherein securing client approval for the website look and feel guidelines comprises: obtaining client examples related to the website's desired look and feel; selecting a project path comprising a custom design allowing design of a custom look and feel and/or a fast-track style allowing selection of a look and feel from predetermined styles; or entering the client examples and the selected project path into the functional design report; or any combination thereof.

25. The system of claim 23, wherein securing client approval for the website functional requirement guidelines comprises: securing desired functional requirements from the client; and/or entering the desired functional requirements into the functional design report.

26. The system of claim 23, wherein creating a website plan comprises: identifying functions of the customized website; dividing functions into function components; sequencing the function components and the functions; or prioritizing the function components and the functions; or any combination thereof.

* * * * *